United States Patent
Fujita et al.

(10) Patent No.: US 6,599,620 B2
(45) Date of Patent: Jul. 29, 2003

(54) CELLULOSIC PARTICLES, SPHERICAL OBJECT COMPRISING CROSS-LINKED POLYMER PARTICLES, AND ADSORBENT FOR BODY FLUID PURIFICATION

(75) Inventors: Kouji Fujita, Ibaraki (JP); Tsutomu Okuyama, Kobe (JP); Kouichiro Tanaka, Settsu (JP); Satoshi Takata, Takasago (JP)

(73) Assignee: Kaneka Corporation, Osaka (JP)

( * ) Notice: Subject to any disclaimer, the term of this patent is extended or adjusted under 35 U.S.C. 154(b) by 0 days.

(21) Appl. No.: 09/341,181

(22) PCT Filed: Jan. 7, 1998

(86) PCT No.: PCT/JP98/00015

§ 371 (c)(1),
(2), (4) Date: Aug. 17, 1999

(87) PCT Pub. No.: WO98/30620

PCT Pub. Date: Jul. 16, 1998

(65) Prior Publication Data

US 2003/0012941 A1 Jan. 16, 2003

(30) Foreign Application Priority Data

| Jan. 7, 1997 | (JP) | 9-000600 |
| Aug. 7, 1997 | (JP) | 9-227525 |
| Aug. 18, 1997 | (JP) | 9-237761 |
| Nov. 25, 1997 | (JP) | 9-340747 |
| Dec. 25, 1997 | (JP) | 9-369666 |

(51) Int. Cl.$^7$ ............................................. B32B 5/22
(52) U.S. Cl. .................. 428/317.9; 428/304.4; 428/308.8; 428/315.5; 428/323; 428/326; 428/327; 428/315.7; 502/400; 502/401; 502/404; 530/814; 530/415

(58) Field of Search .......................... 428/304.4, 308.8, 428/315.5, 317.9, 323, 326, 327, 315.7; 502/400, 401, 404; 530/814, 415

(56) References Cited

U.S. PATENT DOCUMENTS

| 4,637,994 A | * | 1/1987 | Tani et al. .................. 502/404 |
| 5,258,503 A | * | 11/1993 | Yokohari et al. ............ 530/415 |
| 5,292,818 A | * | 3/1994 | Oishi et al. .................. 525/301 |

OTHER PUBLICATIONS

Patent Abstracts of Japan, vol. 16, No. 63, Feb. 18, 1992 & JP 03 259934A, Nov. 20, 1991, abstract.

Patent Abstracts of Japan, vol. 14, No. 43, Jan. 26, 1990 & JP 01 275601 A, Nov. 6, 1989, abstract.

Patent Abstracts of Japan, vol. 1997, No. 11, Nov. 28, 1997 & JP 09 176327A, Jul. 8, 1997, abstract.

* cited by examiner

Primary Examiner—Terrel Morris
Assistant Examiner—Hai Vo
(74) Attorney, Agent, or Firm—Connolly Bove Lodge & Hutz LLP

(57) ABSTRACT

The present invention relates to a cellulosic particle body comprising interconnected cellulosic small particles with small interparticle spaces and to a method of producing said cellulosic particle body which comprises dispersing cellulosic small particles in an alkaline medium and contacting the resulting suspension with a coagulating solution. In this specification, the above technology will be referred to as the first invention.

9 Claims, 14 Drawing Sheets

CELLULOSIC PARTICLES, SPHERICAL OBJECT COMPRISING CROSS-LINKED POLYMER PARTICLES, AND ADSORBENT FOR BODY FLUID PURIFICATION

TECHNICAL FIELD

The present invention relates to a cellulosic particle body, a method of producing said particle body, a spherical type body which comprises crosslinked polymer particles interconnected with the aid of an organic binder comprising a non-crosslinked polymer, a method of producing said spherical type body, and an adsorbent for purification of body fluids which is capable of removing a target substance at a high speed in the therapy of hyperlipemia, autoimmune diseases and immunity-mediated diseases and the like.

BACKGROUND ART

A cellulosic particle body and a spherical type body comprising a crosslinked polymer particle are in broad use in a variety of fields, for example as a support for immobilization of microbial cells or enzymes, an adsorbent matrix for perfumes and pharmaceuticals, an adsorbent for purification of body fluids, a cosmetic additive, a chromatographic stationary phase material, etc. or, thorough introduction of a functional group, even as various ion exchangers.

Much research has been undertaken into the cellulosic particle body.

Japanese Kokai Publication Sho-63-90501 discloses a technology which comprises blending an anionic water-soluble compound with a mixture of viscose and a water-soluble macromolecular compound to prepare a dispersion of microfine particles, coagulating the dispersion under heating or with the aid of a coagulant, regenerating it with an acid, and removing the water-soluble macromolecular compound through a series of coagulation, regeneration and aqueous washing to provide a porous microfine cellulosic particle body with a mean particle diameter of not greater than $3 \times 10^{-4}$ m and a maximum pore volume within a pore volume range of $2 \times 10^{-8}$ to $8 \times 10^{-7}$ m, with the total pore volume of all the pores within said range being not less than $2.5 \times 10^{-5}$ m³/kg. The particle body provided by the above technology is such that the cellulosic particle body as such have fine pores.

Japanese Kokai Publication Sho-63-92602 discloses a technology which comprises blending viscose, calcium carbonate and a water-soluble anionic macromolecular compound to prepare a dispersion of finely divided particles of calcium carbonate-containing viscose, coagulating and neutralizing the dispersion, and decomposing calcium carbonate with an acid to provide a porous cellulosic particle body.

With those technologies, however, the cellulosic particle body obtained are relatively small in diameter, so that in certain applications such as a filler, an adsorbent, etc., it is difficult to carry out a large-scale treatment at a high flow rate and if a high-speed treatment is attempted, the cellulosic particle body tend to be destroyed. Moreover, when such a cellulosic particle body is used for the treatment of body fluids, plugging with blood corpuscles tend to take place.

Accordingly there has been a demand for development of a cellulosic particle body which would have sufficiently high mechanical strength, be compatible with treatment at high flow rates, exploit the pore structure of the cellulosic particle body providing for a large surface area, and be free from the trouble of plugging in the treatment of body fluids.

Meanwhile, in the field of body fluid treatment, a body fluid purification method is being practiced as a therapeutic technique comprising removal of a specific substance(s) from a body fluid, which comprises passing the body fluid through an adsorption device packed with an adsorbent immobilized a substance having an affinity for a target substance on a carrier to thereby adsorb and remove said substance. The method developed initially for this purpose comprised passing whole blood over active charcoal, particularly a coated charcoal particle to remove a target substance. With advances in plasma perfusion membranes, various adsorption devices for removing a target substance from separated plasma have been developed.

Generally speaking, in body fluid purification therapy, the treatment time is preferably as short as possible from the standpoint of the patient's quality of life. For reducing the treatment time, several approaches may be contemplated by using ingenuity in the aspect of operating conditions with the adsorbent material being held unchanged.

First, it may be contemplated to increase the flow rate of the body fluid in the extracorporeal circuit so as to increase the volume of the body fluid to be contacted with an adsorbent per unit time. However, it will adversely affect the patient's quality of life to excessively increase the flow rate of the body fluid withdrawn from the patient's body and circulated extracorporeally. The conventional flow rate of a body fluid for extracorporeal circulation is $0.833 \times 10^{-6}$ to $3.33 \times 10^{-6}$ m³/s (50 to 200 ml/min.). Thus, there is a limit to the flow rate of the body fluid which can be circulated extracorporeally.

It may also be contemplated to increase the capacity of the adsorption apparatus and thereby prolong the time of contact between the body fluid and the adsorbent. However, as the device capacity is increased, the volume of the body fluid existing outside the body during treatment is increased to adversely affect the patient's quality of life, with the result that the device capacity cannot be increased beyond a certain limit. The capacity of the conventional adsorption apparatus for purification of a body fluid is $50 \times 10^{-6}$ to $500 \times 10^{-6}$ m³ (50 to 500 ml) at most.

Then it may also be contemplated to reduce the treatment time by increasing the static adsorptivity of the adsorption apparatus. The static adsorptivity means the saturated amount of adsorption. As a means for enhancing the static adsorptivity, it may be contemplated to enhance the static adsorptivity by increasing the amount of adsorption per unit adsorbent. The factors influencing the adsorption equilibrium relation are the substance having an affinity for the target substance and the contact area effective for adsorbing the target substance. However, said substance having an affinity for the target substance is restricted to a substance having a specific affinity for the particular target substance. Furthermore, it is restricted to a substance substantially not affecting the patient's physiology because the objective is the treatment of a body fluid. It may also be contemplated to increase the effective contact area but, as the minimum requirement, this contact area must have pores receptive to the target substance. Therefore, the maximum contact area of the porous body having such pores is limited by the diameter and number of pores. Thus, there is a limit to enhancing the static adsorptivity by improving the above-mentioned adsorption equilibrium relation.

As mentioned above, because of the restrictions associated with the body fluid purification technology, it has been found difficult to reduce the treatment time, with the amount of adsorption maintained, by improving the device capacity, the flow rate of a body fluid, and said static adsorptivity.

Lastly, it may be contemplated to reduce the treatment time by improving the dynamic adsorptivity of the adsorption apparatus. The dynamic adsorptivity means the magnitude of adsorption rate. As a means for improving the dynamic adsorptivity, it may be contemplated, for instance, to improve the dynamic adsorptivity by optimizing the particle diameter of the adsorbent and the intraparticle diffusion coefficient of the target substance.

Referring to the first approach, i.e. the method of reducing the particle diameter of the adsorbent and, hence, said diffusion distance to thereby improve the dynamic adsorptivity, reducing the particle diameter of the adsorbent results in a reduced diameter of the fluid flow passageway and an increased pressure loss so that the risk for plugging is increased. Therefore, in consideration of the safety of therapy, the particle diameter cannot be reduced too much. Actually, the particle diameter of the conventional adsorbent for plasma perfusion is $50 \times 10^{-6}$ m to less than $1000 \times 10^{-6}$ m and that for direct blood perfusion is $100 \times 10^{-6}$ m to less than $4000 \times 10^{-6}$ m.

Referring to the second approach, that is the method which comprises increasing the diffusion coefficient of the target substance within the adsorbent for insuring a fast transfer of the target substance within the adsorbent to hereby improve the dynamic adsorptivity, this method is also subject to the following restrictions. In the case of the conventional adsorbent for purification of a body fluid which depends on rate-determining diffusion, once the target substance is established, its diffusion coefficient has a constant value according to the structure of the adsorbent so that it becomes necessary to add ingenuity to the adsorbent structure. However, even if the structure is optimized, the diffusion coefficient of the target substance within the adsorbent does not increase beyond the diffusion coefficient in the body fluid where no steric hindrance exists and, therefore, this method is also limited.

Thus, as far as the conventional adsorbent for purification of a body fluid is concerned, there is a limit to improving the dynamic adsorptivity by increasing the particle diameter of the adsorbent and the intraparticle diffusion coefficient of the target substance, with the result that the treatment time can hardly be reduced.

On the other hand, while it is difficult to apply them to the purification of a body fluid, there exists some adsorbent materials which, when used as chromatographic carriers for immobilization of a substance having an affinity for the target substance, can be expected to achieve an improved dynamic adsorptivity.

The principles relating to dynamic adsorptivity are now explained in the first place. As an indicator of dynamic adsorptivity, it is common practice to use a breakthrough curve which represents the time course of change in the concentration of the target substance at the exit of an adsorption apparatus when a solution containing said target substance in a given concentration is passed at a constant flow rate. In estimating the dynamic adsorptivity of an adsorption apparatus under operating conditions, it is preferable to keep the linear velocity of flow within the adsorption apparatus constant, that is to say a constant state of flow around the adsorbent. It should be noted that the term "linear velocity within the adsorption apparatus" is used in this specification to mean the rate of transfer (m/s) of the mobile phase in the adsorption apparatus.

On the other hand, the theoretical plate number is generally used as an indicator of the performance of a column packed with an adsorbent not carrying an adsorbate thereon (a packed column). The theoretical plate number means the minimum multiples of column height which would be required for a target substance to attain an adsorption-desorption equilibrium when a solution containing it is passed through the packed column.

According to Kato et al. [Shigeo Kato, et el., Journal of Fermentation and Bioengineering, 78, 246 (1994)], the above-mentioned breakthrough curve representing the dynamic adsorptivity of an adsorption apparatus can be correlated with the above-mentioned theoretical plate number as an indicator of the performance of a packed column by the following three expressions.

$$\frac{C}{C_0} = 1 - e^{-N\theta} \left\{ 1 + N\theta + \frac{(N\theta)^2}{2!} + \dots + \frac{(N\theta)^{N-1}}{(N-1)!} \right\}$$

$$t^- = \frac{\alpha V}{F}$$

$$\alpha = \frac{q_0}{C_0}$$

wherein t represents time (in seconds); C represents the concentration [kg/m$^3$] of a target substance at the exit of an adsorption apparatus, which is a time-dependent variable; $C_0$ represents the concentration [kg/m$^3$] of the target substance entering the adsorption apparatus, which is a constant; V represents the volume of the adsorption apparatus or the volume of a packed column [m$^3$], which is a constant; $q_0$ represents the amount of adsorption at equilibrium [kg/m$^3$] at $C_0$, i.e. the amount of adsorption which does not increase any further when a solution of the concentration $C_0$ is passed through the adsorption apparatus, which is a constant; F represents the flow rate [m$^3$/sec.] of solution selected so as to be equal to the linear velocity within the adsorption apparatus under operating conditions, which is a constant; N represents the theoretical plate number as found for the target substance when a solution containing it is passed through the packed column at the same flow rate F as that found for the same target substance when the same solution is passed through the adsorption apparatus, which is a constant; t$^-$ represents the average residence time [seconds] of the target substance in the column; θ represents the percentage of t relative to t$^-$; and α is a parameter representing the adsorption efficiency of an adsorbent.

To demonstrate the influence of the theoretical plate number on the breakthrough curve, suitable values were substituted into the above expressions for calculation. The result is shown in FIG. 1. Referring to FIG. 1, the amount of adsorption per unit volume q [kg/m$^3$]of the absorption apparatus up to each point of time t/t$^-$ represents the area above the breakthrough curve, that is the value which can be found by integrating $\{1-(C/C_0)\}$ up to that point of time and dividing the result by the volume of the adsorption apparatus. FIG. 2 shows the time course of the absorption amount q with respect to $q_0$ as calculated by said integration. It can be understood from FIG. 2 that the larger the theoretical plate number of the packed column is, the larger is the adsorption amount which can be adsorbed in a given time and the shorter is the time required for adsorbing a given amount of the substance, indicating that the dynamic adsorptivity of the adsorption apparatus is improved. It is, therefore, clear that the dynamic adsorptivity of an adsorption apparatus can be improved by increasing the theoretical plate number of the packed column.

Furthermore, the theoretical plate number of a packed column is dependent on the minimum column height which is necessary for attaining an adsorption-desorption equilibrium (the height equivalent to a theoretical plate) and the height of the packed column and can be expressed by the following equation.

$$N = \frac{L}{HETP}$$

wherein L [m] represents the height of a packed column and HETP [m] represents the height equivalent to a theoretical plate. Since the column height is fixed, increasing the theoretical plate number of the packed column can be attained by reducing the height equivalent to a theoretical plate which is characteristic of the carrier packed, and the dynamic adsorptivity of an adsorption apparatus can be improved by this method. Whereas the theoretical plate number is dependent on the housing geometry and other factors, the height equivalent to a theoretical plate is a characteristic which is solely dependent upon the properties of the adsorbent or solid phase. Stated differently, in discussing the height equivalent to a theoretical plate, it is permissible to use a packed column geometrically different from the adsorption apparatus used for construction of the breakthrough curve, although the linear velocity of flow in the packed column should be equal to that in the adsorption apparatus.

Meanwhile, it is known that when a housing is packed with a particle having flow-through pores extending through each particle and sub-pores communicating with said flow-through pores and smaller in diameter than the flow-through pores as a stationary phase material for chromatography, a stationary phase material for affinity chromatography or a support for immobilization of an enzyme and a solution is passed through the packing at a suitable flow rate, the migration of a solute within the packing is rapid (perfusion effect) compared with the usual particulate adsorbent not having flow-through pores so that the objective operation can be accomplished at a high speed [Japanese Kohyo Publication Hei-4-500726, Japanese Kohyo Publication Hei-6-507313, N. B. Affean et al.: Journal of Chromatography, 519, 1 (1990), Shigeo Kato et al.: Journal of Fermentation and Bioengineering, 78, 246 (1994)]. In this specification, a carrier having a structure such that a flow passing through its particles occurs when there is a flow around said carrier particles and that, when there is a flow of a liquid such as a body fluid around the carrier particles, a portion of the flow passes through the carrier particles owing to the resultant pressure gradient is referred to as a perfusion type carrier. The above-mentioned carrier having flow-through pores and sub-pores is a perfusion type carrier.

The perfusion type carrier is known to be a stationary phase with a smaller height equivalent to a theoretical plate. In other words, because of occurrence of flows passing through the carrier particles, the measured height equivalent to a theoretical plate of such a perfusion type carrier is smaller than that of the conventional carrier in which the mass transfer of the target substance depends solely on diffusion. Therefore, an adsorption apparatus packed with an adsorbent comprising a substance having an affinity for the target substance as immobilized on a perfusion type carrier shows an improved dynamic adsorptivity.

As a typical perfusion type carrier, there is known POROS (trade name), chromatographic carriers available from Perceptive Biosystems (particle diameters $10\times10^{-6}$ m, $20\times10^{-6}$ m, $5\times10^{-6}$m) (Japanese Kohyo Publication Hei-4-500726). However, since those carriers are intended to be used for chromatography, they are available only in small particle diameter ranges in consideration of the ease of packing and flow. Therefore, when a container is packed with this kind of carrier and a fluid from a fermentation tank, a slurry, blood or the like is passed through it, plugging tends to take place owing to the small particle diameter. Moreover, in order to attain a perfusion effect, a solution must be passed at a high linear velocity of not less than $2.8\times10^{-3}$ m/s.

Heretofore unknown is a perfusion type carrier which is large in particle diameter and provides a perfusion effect even when a solution is passed at a low speed. Neither known to this day is a cellulosic perfusion type carrier. For example, POROS (trade name) mentioned above is a carrier comprising conglomerates of fine particles of a styrene-divinylbenzene copolymer.

On the other hand, porous particles of crosslinked polymers have large specific surface areas and have been used broadly as chromatographic column packings or adsorbents and, furthermore, such particles have been actively developed. Such conglomerates of crosslinked polymer particles may have minute voids between the constituent crosslinked polymer particles of the conglomerate and, therefore, express a variety of functions not obtainable with discrete crosslinked polymer particles. The following technology is available for the construction of spherical type bodies or conglomerates having pores between the adjacent constituent crosslinked polymer particles.

Japanese Kokai Publication Hei-9-25303, for instance, discloses a method for interconnecting particles by way of polymerization which comprises polymerizing a monomer on the surface of crosslinked polymer particles. More particularly, this method comprises dispersing crosslinked polymer particles in a dispersion medium containing a monomer, polyvinyl alcohol, etc. to let the monomer penetrate into the crosslinked polymer particles and then polymerizing the monomer to thereby interconnect the crosslinked polymer particles.

However, because the crosslinked polymer particles are bonded to one another by polymerization, this method requires a complicated polymerization procedure and, moreover, is restricted in the diameter of crosslinked polymer particles which can be bonded together ($100\times10^{-6}$ m at most). In addition, since the monomer so polymerized covers up the entire surface of the crosslinked polymer particles, the inherent functions of the particles are impaired. Another disadvantage is that, after use, the crosslinked polymer particles cannot be reused.

The present invention has for its object to provide a carrier or adsorbent which overcomes the above-mentioned disadvantages.

More particularly, in the light of the above-mentioned arts, it is an object of the present invention to provide a cellulosic particle body which is suited for use in treatments at high flow rates and has excellent mechanical strength and a large surface area and a method of producing said particle body.

In the light of the above-mentioned arts, it is a further object of the invention to provide a cellulosic particle body which can be provided in a relatively large particle diameter range and produces a perfusion effect even when a solution is passed at a comparatively low linear velocity and a method of producing said particle body.

In the light of the above-mentioned arts, it is a still another object of the invention to provide a connected particle body comprising assemblages of crosslinked polymer particles with minute interparticle spaces which (1) can be manufactured by a simpler procedure as compared with the prior art, (2) is less restricted in the available particle diameter of assemblages of crosslinked polymer particles as compared with the prior art, (3) has an exposed area uncovered by a monomer polymerized on the surface of crosslinked polymer particles and consequently allowing expression of the inherent functions of said particles, and (4) permits reusing of the crosslinked polymer particles from the assemblages after use.

It is a still further object of the invention to provide an adsorbent for purification of body fluids which is capable of removing a target substance at a high speed so as to reduce the treatment time with the amount of adsorption maintained at a high level.

SUMMARY OF THE INVENTION

The present invention relates to a cellulosic particle body comprising interconnected cellulosic small particles and having voids between particles and to a method of producing said cellulosic particle body which comprises dispersing cellulosic small particles in an alkaline medium and contacting the resulting suspension with a coagulating solution. In this specification, the above technology will be referred to as the first invention.

In another aspect, the present invention relates to a perfusion type cellulosic particle body which comprises porous cellulosic small particles interconnected to have void between the cellulosic small particles as produced by dispersing the porous cellulosic small particles in an alkaline medium to prepare a suspension and contacting the resulting suspension with a coagulating solution and to a method of producing said perfusion type cellulosic particle body which comprises dispersing porous cellulosic small particles in an alkaline medium and contacting the resulting suspension with a coagulating solution. In this specification, this technology will be referred to as the second invention.

The present invention further relates to a spherical type body which comprises crosslinked polymer particles having diameters within a range of $0.1 \times 10^{-6}$ to $100 \times 10^{-3}$ m with a standard deviation of not greater than 100% of their mean diameter and which has a diameter of $1 \times 10^{-6}$ m to $100 \times 10^{-3}$ m, and satisfies the following conditions (A) to (C):

(A) that said crosslinked polymer particles are interconnected via an organic binder comprising a non-crosslinked polymer;

(B) that the surfaces of said crosslinked polymer particles have area(s) not covered with said organic binder but remaining exposed;

(C) that voids exist between the interconnected crosslinked polymer particles.

The present invention further relates to a method of producing the spherical type body comprising crosslinked polymer particles which comprises immersing crosslinked polymer particles having diameters within a range of $0.1 \times 10^{-6}$ m to $10 \times 10^{-3}$ m with a standard deviation of not more than 100% of their mean diameter in a solution containing an organic binder comprising a non-crosslinked polymer in an organic solvent which does not dissolve said crosslinked polymer particles but dissolves said organic binder and then evaporating said organic solvent under stirring to interconnect said crosslinked polymer particles via said organic binder separating out on surfaces of said crosslinked polymer particles.

The spherical type body mentioned above need only be substantially spherical and includes a spheroidal body with a ratio of minor axis/major axis up to about 0.7. In this specification, this technology will be referred to as the third invention.

The present invention relates, in a further aspect, to an adsorbent for purification of body fluids which comprises a perfusion type carrier and, as immobilized thereon, a substance having an affinity for a target substance, to an adsorption apparatus for purification of body fluids which comprises a housing packed with said adsorbent and to a method of purifying a body fluid using said adsorption apparatus for purification of body fluids. In this specification, the above technology will be referred to the fourth invention.

DETAILED DESCRIPTION OF THE INVENTION

Figure 1:
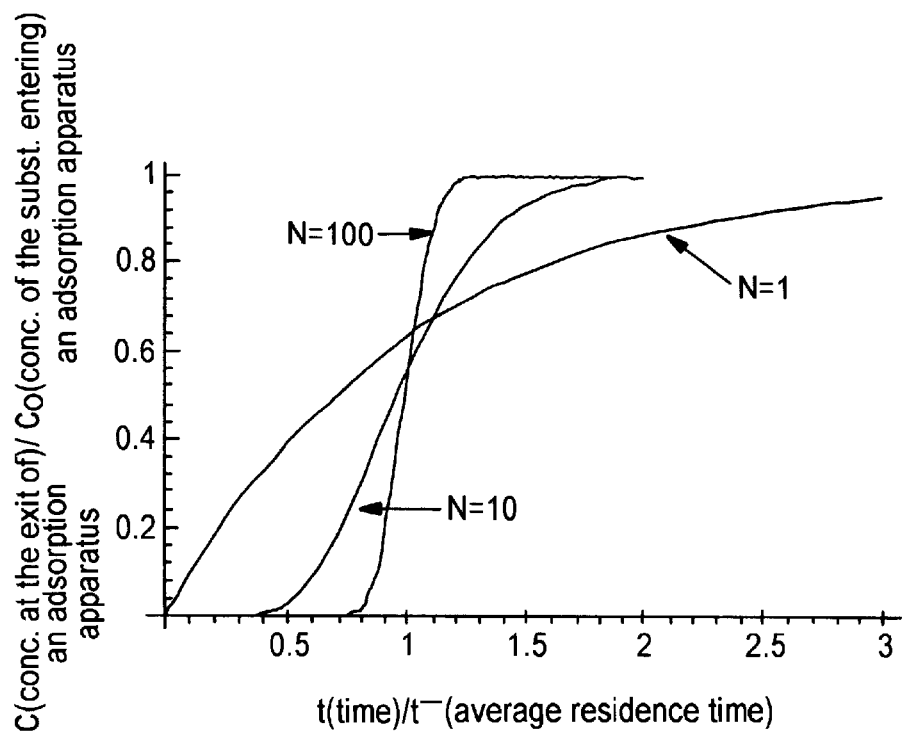
FIG. 1 is a diagram showing the effect of the theoretical plate number on the breakthrough curve.
Figure 2:
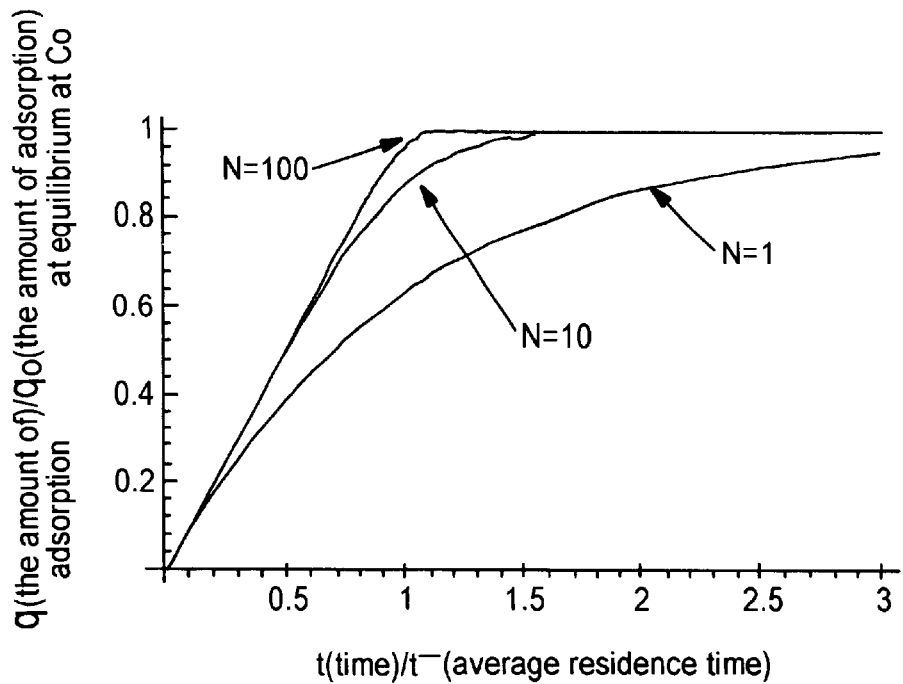
FIG. 2 is a diagram showing the time course of change in the amount of adsorption relative to $q_0$.

The first invention is now described in detail.

The cellulosic small particles mentioned above are particles of a cellulosic substance selected from among, for example, cellulose, cellulose derivative and regenerated cellulose.

The cellulose mentioned above is not particularly restricted but includes degreased cotton fiber, hemp pulp, wood pulp, and purified celluloses available from said pulps, among others.

The cellulose derivative mentioned above is not particularly restricted but includes a compound containing partially esterified hydroxyl groups (ester derivative); a compound containing etherified hydroxyl groups (ether derivative), among others.

The ester derivative of cellulose is not particularly restricted but includes cellulose acetate, cellulose propionate, nitrocellulose, cellulose phosphate, cellulose acetate butyrate, cellulose nitrate, dithiocarboxylic esters of cellulose (e.g. viscose rayon), among others.

The above-mentioned ether derivative of cellulose is not particularly restricted but includes methylcellulose, ethylcellulose, benzylcellulose, tritylcellulose, cyanoethylcellulose, carboxymethylcellulose, carboxyethylcellulose, aminoethylcellulose and oxyethylcellulose, among others.

The regenerated cellulose mentioned above is a cellulosic material obtainable by converting cellulose to an easily moldable derivative and reconverting it to cellulose after molding and specifically includes but is not limited to the various cellulosic materials available upon hydrolysis of ester derivatives of cellulose such as cellulose acetate and cellulose propionate.

The cellulosic small particles mentioned above may be porous or non-porous but is preferably porous. When the cellulosic small particles are porous, the particles will present with a relatively greater surface area per unit volume.

As the above-mentioned cellulosic small particles, there can be utilized those particles which are conventionally used in applications such as gel filtration stationary phases, cellulosic ion exchanger materials, stationary phase materials for affinity chromatography, polymer flocculants, adsorbents for purification of body fluids, cosmetic additives, and so on.

The cellulosic small particles can be produced by the conventional technology. For example, said porous cellulosic small particles can be produced by the methods described in Japanese Kokai Publications Sho-63-90501, Sho-63-92602 and so on. More particularly, the following procedures, for instance, can be utilized.

(1) A basic aqueous polymer solution containing cellulose xanthate and a water-soluble polymer is mixed with a water-soluble anionic polymer to prepare a particle dispersion of basic aqueous polymer solution, which is then heated or treated with a cellulose xanthate coagulant so as to cause the cellulose xanthate contained in the dispersion to be coagulated as fine particles. Since those cellulose xanthate particles contain said water-soluble polymer, the polymer is then removed. Then, the cellulose xanthate particles are neutralized with an acid for regeneration of cellulose to provide the objective cellulosic small particles.

As an alternative, the coagulation of cellulose xanthate can be effected by adding an acid to said dispersion. In this case, after removal of said water-soluble polymer, the acid added is neutralized for regenerating cellulose to provide the objective cellulosic small particles.

(2) A viscose, calcium carbonate and a water-soluble anionic polymer are blended to prepare a dispersion of viscose fine particles containing calcium carbonate, which is then heated or treated with a coagulant to cause the viscose in said dispersion to be coagulated. The dispersion is then neutralized with an acid to give fine particles of cellulose. The cellulose particles are separated from the dispersion and, after removal of the calcium carbonate by acidolysis, dried to provide the objective cellulosic small particles.

The mean diameter of said cellulosic small particles is preferably in the range of $1 \times 10^{-6}$ to $500 \times 10^{-6}$ m. If it is less than $1 \times 10^{-6}$ m, it will be difficult to provide sufficient voids among the cellulosic small particles constituting the cellulosic particle body. On the other hand, if the upper limit of $500 \times 10^{-6}$ m is exceeded, the great load of each the cellulosic small particles may not allow the product particle body to maintain its constituent cellulosic small particles in the intact agglomerated condition. The more preferred range is $5 \times 10^{-6}$ to $100 \times 10^{-6}$ m.

The cellulosic particle body of the first invention comprises a conglomerate of said cellulosic small particles interconnected so as to have voids between the cellulosic small particles.

The voids mentioned above are formed internally of the cellulosic particle body and, therefore, the cellulosic particle body of the first invention is provided with a multiplicity of minute pores, some of which are exposed on the surface while the others distributed within the particle body.

Preferably the cellulosic particle body of the first invention is a conglomerate of cellulosic small particles interconnected in the presence of a binder. The inventors of the present invention found that the interposition of a binder between individual cellulosic small particles leads to a marked increase in the strength of the cellulosic particle body as compared with the corresponding particle body assembled without a binder. The use of a binder provides for the additional advantage that the strength of the particle body can be controlled by adjusting the amount of the binder.

The binder mentioned above is not particularly restricted but may for example be an organic compound, an inorganic compound, a synthetic organic low molecular compound, a synthetic inorganic low molecular compound, a naturally-occurring organic low molecular compound, a naturally-occurring inorganic low molecular compound, a synthetic organic high molecular compound, a synthetic inorganic high molecular compound, a naturally-occurring organic high molecular compound or a naturally-occurring inorganic high molecular compound.

The inorganic compound mentioned above is not particularly restricted but may for example be a compound which, upon contact with a coagulating solution, forms a three-dimensional network structure. As an example of such inorganic compound there can be mentioned water glass. Water glass generally means a concentrated aqueous solution of either sodium oxide or potassium oxide and silicon dioxide. This solution reacts with various metal salts to allow growth of a precipitate in the solution. When cellulosic small particles and water glass (intended to function as a binder) are dispersed in an alkaline medium and the resulting suspension is brought into contact with an aqueous solution of a metal salt (intended to function as a coagulating solution), a precipitate is formed to give rise to a cellulosic particle body comprising interconnected cellulosic small particles.

The synthetic inorganic high molecular compound is not particularly restricted but includes inorganic polymer flocculants such as poly(aluminum chloride), poly(aluminum sulfate), poly(ferric chloride), poly(ferric sulfate) and so on.

The synthetic organic high molecular compound mentioned above is not particularly restricted but includes various organic polymer flocculants such as polyacrylonitrile, polyacrylamide, poly(sodium acrylate) and acrylic acid-acrylamide copolymer, among others.

The naturally-occurring organic high molecular compound mentioned above is not particularly restricted but includes, for example, cellulosic substances, starch and starch derivatives, and soluble salts of alginic acid.

As the binders mentioned above, among these, substances having functional groups capable of undergoing hydrogen bonding with the hydroxyl groups of the cellulose molecule or cellulose derivative molecule are preferred. Still more preferred are substances structurally resembling cellulose. More particularly, cellulosic substances, starch and starch derivatives and soluble salts of alginic acid can be mentioned, among others. Those substances have structure similar to cellulose, having glucose structures with attendant hydroxyl groups, so that they may undergo hydrogen bonding with the hydroxyl groups of the cellulose molecule or cellulose derivative molecule. Those binders are now described in detail.

The cellulosic substance mentioned above may be either the same substance as or different from said cellulose molecule constituting said cellulosic small particles, such as cellulose, cellulose derivative, regenerated cellulose molecule and the like.

The cellulose mentioned just above is not particularly restricted but includes the species mentioned hereinbefore.

The cellulosic derivative mentioned above is not particularly restricted but includes the species mentioned hereinbefore.

The regenerated cellulose mentioned above is not particularly restricted but includes the species mentioned hereinbefore.

The starch and starch derivative mentioned above are not particularly restricted but include various esters of starch, e.g. acetate ester, succinate ester, nitrate ester, phosphate ester, xanthate ester, etc.; various ethers of starch, e.g. allyl ether, methyl ether, carboxymethyl ether, carboxyethyl ether, hydroxyethyl ether, hydroxypropyl ether, etc.; and degradation products of native starch, such as pyrodextrin, starch oxide, etc.

The pyrodextrin mentioned above is not particularly restricted but includes white dextrin, yellow dextrin, and British gum.

The starch oxide mentioned above is not particularly restricted but includes hypochlorous acid-oxidized starch and dialdehyde-starch, among others.

The soluble salt of alginic acid mentioned above is not particularly restricted but includes sodium alginate, for instance.

It is known that an aqueous solution of said soluble salt of alginic acid forms an insoluble salt when brought into contact with an aqueous solution of a divalent or higher valence metal salt except for magnesium and mercury ions. Since this insolubilization occurs instantaneously, dripping an aqueous solution of a soluble salt of alginic acid into an aqueous solution of a divalent metal salt such as calcium chloride results in the easy formation of an insoluble salt. For example, when cellulosic small particles and said soluble salt of alginic acid (intended to function as a binder) are dispersed in an alkaline medium and the resulting suspension is contacted with an aqueous solution of a divalent or higher valence metal salt excepting magnesium and mercury ions (intended to function as said coagulating solution), the insoluble salt is formed to provide said cellulosic particle body comprising interconnected cellulosic small particles.

The binders mentioned above, inclusive of said cellulosic substances, starch and starch derivatives, can be used each independently or in a combination of two or more species.

It is also possible to use a binder which is a conjugate of two or more molecules constituting a binder. More particularly, the copolymer of said synthetic organic high molecular compound with said naturally-occurring organic high molecular compound, for example an acrylamide-carboxymethylcellulose graft polymer, can be mentioned by way of example.

Referring to said cellulosic particle body, the mode of interconnection of individual cellulosic small particles need not necessarily be covalent bonding but may be any binding mode by which the resulting conglomerate of cellulosic small particles may substantially retain its integral form. Thus, in addition to said covalent bonding, the mode of interconnection of cellulosic small particles includes an intertwining of cellulose or cellulose derivative molecules, hydrogen bonding and other modes of chemical bonding.

For example, cellulose consists of D-glucopyranose units connected by $\beta 1 \rightarrow 4$ glycosidic bonds and has three hydroxyl groups per glucose unit of the backbone chain. Those hydroxyl groups are considered to be forming hydrogen bonds between molecular chains or intramolecularly and hydrogen bonds between acetal oxygen atoms. In said cellulose derivatives, too, unsubstituted hydroxyl groups appear to be playing the same roles.

When the cellulosic particle body comprises a conglomerate of cellulosic small particles interconnected in the presence of a binder, the connection by molecular intertwining between the cellulosic small particle and the binder, the connection by chemical bonding such as hydrogen bonding between the cellulose small particle, the binder and so on are also included.

Observation of the mutually connected state of particles in the cellulosic particle body reveals the following three possible cases.

(1) The adjacent particles are interconnected by point contact of their surfaces.
(2) The adjacent particles adhere each other and are interconnected by planar contact of their surfaces.
(3) In appearance, the surfaces of adjacent particles are apart from each other but bridged by filamentous or other structures.

When the cellulosic particle body comprises a conglomerate of cellulosic small particles interconnected in the presence of a binder, the above state (3) may be included and, in this case, the binder is used as said filamentous or other structures.

The spaces formed between particles in any of the above three cases are the voids among cellulosic small particles in the cellulosic particle body according to this invention.

The preferred mean particle diameter of the cellulosic particle body of the invention is $10 \times 10^{-6}$ to $5000 \times 10^{-6}$ m and can be judiciously selected according to the intended application.

When the mean diameter of said cellulosic small particles is not less than $1\times10^{-6}$ m, the cellulosic particle body comprising such interconnectd cellulosic small particles can be a stable particle body in the case of a diameter thereof of not less than $10\times10^{-6}$ m. When the mean particle diameter of the cellulosic particle body is less than $10\times10^{-6}$ m, the resulting cellulosic particle body may not be stable enough because it has few interconnecting points and is prone to destruction.

The specific surface area of said cellulosic particle body in dry condition is preferably not less than $2\times10^4$ m 2/kg. If it is less than $2\times10^4$ m$^2$/kg, the effective area available for the intended application will be too small. The still more preferred range is not less than $5\times10^4$ m$^2$/kg.

The geometry of said cellulosic particle body is not particularly restricted provided that it comprises a conglomerate of individual cellulosic small particles interconnected to have voids between particles, thus may for example be spheroidal or substantially spherical.

The cellulosic particle body according to the first invention can be produced by dispersing said cellulosic small particles in an alkaline medium and contacting the resulting suspension with a coagulating solution.

The alkaline medium mentioned above is not particularly restricted but includes, among others, an aqueous solution of sodium hydroxide, an aqueous solution of lithium hydroxide, an aqueous solution of potassium hydroxide, an aqueous solution of cesium hydroxide and an aqueous solution of rubidium hydroxide.

For adjusting its viscosity, said alkaline medium may be supplemented with a thickener such as glycerin.

The hydrogen ion concentration of said alkaline medium is not particularly restricted provided that it is within the alkaline range but is preferably not below pH 9. The more preferred pH range is not less than 10 and the still more preferred range is not less than 12. When the pH of the medium is less than 10, contacting said suspension of cellulosic small particles with the coagulating solution may result in a failure to interconnect the particles with the individual particles remaining dispersed.

The pH values mentioned in this specification are values given by $pH=-\log_{10}[H^+]$ assuming that the degree of dissociation of an acid or an alkali in aqueous solution=1 and $[H^+]\times[OH^-]=10^{-14}$.

The preferred concentration of said suspension of cellulosic small particles is 50 to 75 volume %.

The above-mentioned concentration of said suspension means the percentage of the total volume of cellulosic small particles occurring in a suspension based on the volume of the suspension. Here, the concentration of the residue available upon filtration of the above suspension is assumed to be 100 volume %. When the cellulosic small particles are porous particles and have a large water content, their apparent specific gravity is not much different from the specific gravity of the solution so that volume % is substantially equivalent to weight %.

When the suspension concentration of cellulosic small particles is less than 50 volume %, contacting droplets of the suspension with a coagulating solution yields a fragment-like cellulosic particle body with weak strength. When the concentration exceeds 75 volume %, no smooth-surfaced liquid droplets are obtained so that the cellulosic particle body will be a coarse block. The more preferred concentration is 60 to 70 volume %.

The suspension mentioned above may be a dispersion of cellulosic small particles and a binder in an alkaline medium.

The method of suspending said binder is not particularly restricted but may for example be the method which comprises dissolving said binder in said alkaline medium and blending the resulting solution or suspension with said cellulosic small particles.

The proper amount of addition of said binder cannot be stated in general terms because it depends on the molecular weight of the binder, among other factors. Usually, however, the preferred concentration of the binder in the suspension of prepared by dispersing cellulosic small particles and binder in said alkaline medium is 0.01 to 50 weight %. When the concentration of the binder is less than 0.01 weight %, the binder does not sufficiently discharge the function of a binder so that, compared with the cellulosic particle body prepared without the aid of a binder, the binder does not contribute in any significant measure to the mechanical strength of the cellulosic particle body. When the concentration exceeds 50 weight %, the excess of the binder may eliminate the spaces among the constituent cellulosic small particles. The more preferred concentration range is 0.1 to 30 weight % and the still more preferred range is 0.2 to 20 weight %.

As mentioned above, the preferred mean diameter of cellulosic small particles is $1\times10^{-6}$ to $500\times10^{-6}$ m. Within this range, the trouble of the binder added filling up the interparticle spaces, which is encountered when the mean particle diameter is smaller than $1\times10^{-6}$ m, can be avoided.

The preferred viscosity of the suspension dispersing said cellulosic small particles and binder in said alkaline medium at room temperature is $5\times10^{-4}$ to $1\times10^4$ Pa·s. When the viscosity is below $5\times10^{-4}$ Pa·s, droplets of the suspension contacting the coagulating solution tend to be deformed so that no spherical type body can be obtained. When the viscosity exceeds $1\times10^4$ Pa·s, droplets of the suspension may be hard to be deformed so that a spherical conformation cannot be given.

The method and apparatus for viscosity measurement are not particularly restricted provided that any of the conventional techniques and instruments by the viscosity over the range of $5\times10^{-4}$ to $1\times10^4$ Pa·s can be determined. The term "viscosity" as used herein means the viscosity defined in JIS Z 8802-1959. Thus, it is the internal resistance of a liquid which is expressed by the magnitude of the strain generated in the direction of shear rate per unit area in a plane perpendicular to the direction of the shear which exists in the liquid and its dimension is (mass)/(length×time). All viscosities within the above viscosity range need not be measured with one and the same apparatus. Moreover, the method and apparatus for viscosity measurement may be expedient ones, the accuracy of which may for example be about 10%.

The apparatus for viscosity measurement is not particularly restricted but includes a capillary viscometer, a short-tube viscometer, a falling-ball viscometer, a tumbling-ball viscometer, a falling-cylinder viscometer, a coaxial-cylinder rotating viscometer, and an air-cell viscometer. When the viscosity of the solution is within the range of $5\times10^{-4}$ to $1\times10^2$ Pa·s, the air-cell viscometer is preferably used. The coaxial-cylinder rotating viscometer is preferred for determination within the range of 1 to $1\times10^4$ Pa·s.

As said cellulosic small particles are suspended in said alkaline medium, the cellulose or cellulose derivative becomes alkali cellulose and swells in the surface layer of said cellulosic small particles and, at the same time, the hydrogen bonds are cleaved so that the mobility of the cellulose or cellulose derivative molecules is remarkably increased. In case a binder is concomitantly present, the suspension becomes more ready to take up the binder.

The duration of suspending cellulosic small particles in said alkaline medium is preferably not less than 1 minute. When it is less than 1 minute, it is difficult to insure swelling of the cellulose or cellulose derivative as alkali cellulose on the surface of particles so that the cellulosic small particles may not be fully interconnected. The more preferred duration is 1 hour or longer.

Then, this suspension is brought into contact with a coagulating solution, whereby said cellulosic small particles are interconnected.

Contacting said suspension with said coagulating solution results in a marked decrease in the mobility of the cellulose or cellulose derivative molecule so that the intertwining, hydrogen bonding or the like of the cellulose or cellulose derivative molecules of the cellulosic small particles may take place. Moreover, when a binder is concomitantly present, the mobility of the binder itself is also considerably decreased so that the interwining and hydrogen bonding or other bonding between the cellulosic particle and the binder molecule may take place.

The coagulating solution mentioned above is not particularly restricted provided that it will deprive fluidity of said alkali cellulose or alkali cellulose and binder. Thus, for example, organic solvents such as ethanol, acetone, etc.; solutions of salts such as calcium salts; solutions of inorganic acids such as hydrochloric acid, sulfuric acid, phosphoric acid, etc.; organic acids such as acetic acid etc.; and acidic solutions having pH values lower than the pH value of said suspension; and pure water can be mentioned. Those may be used each independently or in a combination of two or more species.

The method of contacting said suspension with said coagulating solution is not particularly restricted but includes, among others, the method which comprises dispersing said suspension in said coagulating solution, the method which comprises preparing droplets of said suspension and bringing the droplets into contact with said coagulating solution; and the method which comprises atomizing said coagulating solution into, for example, a mist and causing the mist to contact said suspension. Particularly in consideration of the ease of control over the mean particle diameter of the resulting cellulosic particle body, the method which comprises preparing droplets of the suspension and letting the droplets contact the coagulating solution is preferred.

When the suspension is formed into droplets ahead of time and contacted with the coagulating solution, the diameter of said droplets is preferably not greater than $5\times10^{-3}$m. When the diameter is greater than $5\times10^{-3}$ m, the surface tension is so weak that it is difficult to form the droplets.

The method of forming said suspension into droplets is not particularly restricted but includes, among others, the method which comprises ejecting said suspension from a capillary device into a gas phase and the method comprising the use of a sprayer. Particularly because finely divided droplets can be formed, the use of a sprayer or atomizer is preferred.

The sprayer mentioned above is not particularly restricted provided that the suspension can be atomized into droplets measuring $5\times10^{-3}$ m or less in diameter. Thus, for example, a rotary disk sprayer, a pressure nozzle sprayer, and a twin-fluid nozzle sprayer can be mentioned.

The rotary disk sprayer mentioned above is based on the principle that a liquid dripped onto a disk revolving at a high speed will be centrifugally forced to collide with a gas such as air and be atomized. The mean diameter of the resulting droplets can be easily controlled by adjusting the feeding rate of the liquid and the rotational speed of the rotary disk.

The pressure nozzle sprayer mentioned above is such that a liquid under high pressure is ejected from small orifices into an ambient gas such as air to atomize it. The mean diameter of the resulting droplets can be easily controlled by adjusting the feeding rate of the liquid, the pressure applied, and the diameter of the orifices.

The twin-fluid nozzle sprayer mentioned above is designed to atomize a liquid by driving it with a high-pressure with use of compressed gas, even if a liquid is under low pressure. The mean diameter of the droplets can be easily controlled by adjusting the delivery rate of the liquid and the ejection speed of compressed gas.

The diameter of droplets of said suspension can be designed with comparative ease by judicious selection of a suitable one of the above-mentioned methods.

The duration of contact between said suspension and coagulating solution is preferably not less than 1 second. When the duration is less than 1 second, the cellulosic small particles may not be sufficiently interconnected. The more preferred duration is 1 minute or longer.

The cellulosic particle body of the first invention has interparticle voids or spaces and, therefore, presents with a large surface area relative to the volume of the particles, so that it can be used with advantage as a support for immobilization of microbial cells or enzymes, a carrier or matrix for adsorption of perfumes and chemicals, and a cosmetic additive, among other uses. Moreover, because it has high strength, this cellulosic particle body is amenable to operations at high flow rates. For those uses, the optimum cellulosic particle body can be selected with reference to the size, internal structure of the particle body, and the other factors.

The above cellulosic particle body may be put to use as it is or used after modification by, for example, filling an inorganic or organic substance into said interparticle spaces between the cellulosic small particles or reacting the particle body with various substances.

By the above method of producing said cellulosic particle body, cellulosic small particles can be easily interconnected and, moreover, the required voids between the cellulosic small particles can be easily provided. Furthermore, by judicious selection of the method of forming droplets of the suspension, the mean particle diameter of the product cellulosic particle body can be modulated with comparative ease according to the intended use.

The second invention is now described in detail.

The alkaline medium for use in the second invention is not particularly restricted but includes the various media mentioned hereinbefore.

For adjusting its viscosity, said alkaline medium may be supplemented with glycerin, a water-soluble polymer or the like.

The preferred pH of said alkaline medium is not less than 13 (concentration: not less than 0.1 N). The more preferred pH is 14.3 or higher (concentration: not less than 2 N). When the pH is less than 13, contacting a suspension containing cellulosic small particles with a coagulating solution results in a dispersion of discrete cellulosic small particles, thus failing to form the conglomerate of interconnected particles in some cases.

The cellulosic small particles for use in this second invention may be the same cellulosic small particles as those described in detail hereinbefore for the first invention.

The cellulosic small particles for use in the second invention are porous particles with a pore diameter suited for the intended application. Such porous cellulosic small particles can be produced by the method of producing the cellulosic particle body which has been described in detail for the first invention.

The perfusion type cellulosic particle body of the second invention can be produced by dispersing said cellulosic small particles in said alkaline medium and contacting the resulting suspension with a coagulating solution.

The duration of dispersing said cellulosic small particles in said alkaline medium is preferably not less than 1 minute. If it is less than 1 minute, it may be found difficult to interconnect said cellulosic small particles sufficiently. The more preferred duration is not less than 1 hour.

The suspension concentration of said cellulosic small particles is preferably 50 to 75 volume %.

The suspension concentration mentioned above is the percentage of the total volume of cellulosic small particles in the suspension relative to the volume of the suspension.

When the suspending concentration of said cellulosic small particles is less than 50 volume %, contacting droplets of the suspension with a coagulating solution yields a fragmentary form of cellulosic particle body, the strength of which may be low. When the concentration exceeds 75 volume %, smooth-surfaced droplets can hardly be obtained and the cellulosic particle body may be a coarse block. The more preferred range is 60 to 70 volume %.

The preferred size of said droplets is preferably not greater than $3\times10^{-3}$ m in mean diameter. If the mean diameter exceeds $3\times10^{-3}$ m, the surface tension will be so weak that droplets may not be formed.

The method for forming said suspension into droplets is not particularly restricted but may for example be the atomizing technology described in detail above for the first invention.

The coagulating solution mentioned above is not particularly restricted but may for example be any of the coagulating solutions described in detail for the first invention. Among the coagulating solutions, use of an acidic solution is preferred.

The acidic solution mentioned above is preferably a solution with a pH value of 1 or less (concentration: not less than 0.1 N). The more preferred solution is one having a pH value of −0.3 or less (concentration: not less than 2 N). When the pH exceeds 1, contacting a suspension containing cellulosic small particles with an acidic solution results in a dispersion of discrete cellulosic small particles and the desired conglomeration may not be easily achieved.

The acidic solution mentioned above is not particularly restricted but includes aqueous solutions of HCl, $H_2SO_4$, $HNO_3$ and $H_3PO_4$, etc.

To adjust its viscosity, said acidic solution may be supplemented with glycerin, a water-soluble polymer or the like.

The method of contacting droplets of said suspension with said coagulating solution is not particularly restricted but includes, among others, the method which comprises dripping said droplets into said coagulating solution; the method which comprises atomizing said coagulating solution, for example into a mist, and bringing the mist into contact with said droplets.

The duration of contacting droplets of said suspension with said coagulating solution is preferably not less than 1 minute. If it is less than 1 minute, the cellulosic small particles may not be fully conglomerated. The more preferred duration is not less than 1 hour.

In the perfusion-type cellulosic particle body of this invention, the mode of interconnection of said cellulosic small particles is not necessarily covalent bonding but may be any mode of interconnection in which the assemblage of individual particles can be maintained in a stable manner.

For example, the interconnection includes that by intertwining of cellulose molecules and that by chemical bonding such as hydrogen bonding.

The ratio value of the mean particle diameter of said perfusion type cellulosic particle body is preferably less than 50 relative to the mean diameter of constituent cellulosic small particles. If the value exceeds 50, the voids between small particles which serve as flow-through pores will be so small that the desired perfusion effect is decreased.

The mean particle diameter mentioned above is selected according to the intended application. Usually, it is preferably $20\times10^{-6}$ to $3\times10^{-3}$ m.

For the application in which a housing is packed with said perfusion type cellulosic particle body and a solution comparatively liable to cause plugging is passed, the mean particle diameter of said particle body is preferably not less than $100\times10^{-6}$ m and the flow rate of the solution is preferably not less than $3\times10^{-4}$ m/s within the range which does not cause plugging. When the mean particle diameter is less than $100\times10^{-6}$ m, plugging tends to take place and when the flow rate is less than $3\times10^{-4}$ m/s, the perfusion effect is not sufficient so that the efficiency of operation per unit time will be sacrificed.

The dried perfusion type cellulosic particle body preferably has a specific surface area of not less than $2\times10^4$ m$^2$/kg by the BET method. If the specific surface area is smaller than $2\times10^4$ m$^2$/kg, the effective working area for an application will be too small. The more preferred specific surface area is not less than $5\times10^4$ m$^2$/kg.

The above perfusion type cellulosic particle body utilizes the cellulosic particle body described in detail hereinbefore. This perfusion type cellulosic particle body comprises a plurality of cellulosic small particles interconnected so as to have voids between the constituent particles, in which said voids between small particles function as flow-through pores while the small pores in the plurality of interconnected cellulosic small particles which are open to said through-pores function as sub-pores. The geometry of said particle body is usually spheroidal or spherical.

The perfusion type cellulosic particle body can be used in many different applications by the judicious selection of a porous cellulosic small particle and the diameter ratio according to an application. As such applications, there may be mentioned gel filtration stationary phase, cellulosic ion exchanger materials, stationary phase materials for affinity chromatography, adsorbent matrices for perfumes and chemicals, supports for immobilization of microbial cells and enzymes, and adsorbent carriers for purification of body fluids.

The method of producing the perfusion type cellulosic particle body of the second invention comprises dispersing porous cellulosic small particles in an alkaline medium and contacting the resulting suspension with a coagulating solution to let said cellulosic small particles be interconnected so as to have voids between said cellulosic small particles.

According to the above production method, cellulosic small particles can be easily interconnected and conglomerated with provision of voids between particles. Furthermore, since it does not involve the use of an organic solvent in the course of production and facilitates washing, the method is very satisfactory in the prevention of environmental pollutions.

The third invention is now described in detail.

The representative monomers for use in the preparation of the crosslinked polymer particles according to the third invention may be styrene and its derivatives such as α-methylstyrene, chloromethylstyrene, styrenesulfonic acid, etc.; acrylic or methacrylic acid (briefly, (meth)acrylic acid) and their alkyl esters, e.g. methyl (meth)acrylate, ethyl (meth)acrylate, butyl (meth)acrylate, lauryl (meth)acrylate, stearyl (meth)acrylate, sulfopropyl (meth)acrylate, 2-sulfoethyl (meth)acrylate, hydroxyethyl (meth)acrylate, dimethylaminoethyl (meth)acrylate, polyethylene glycol (meth)acrylate (the degree of polymerization of ethylene oxide=2 to 20), hydroxypropyl (meth)acrylate, polypropylene glycol (meth)acrylate, etc.; vinyl acetate, vinylpyridine and its quaternization product; vinylsulfonic acids such as 2-acryloylamino-2-methyl-propanesulfonic acid, 2-acrylamido-2-propanesulfonic acid, methacryloyloxypropylsulfonic acid, etc.; vinyl cyanides such as acrylonitrile, methacrylonitrile, etc.; and vinyl halides such as vinyl chloride, vinyl bromide, etc., although the above is not an exhaustive listing. Those monomers can be used each independently or in a combination of two or more species. However, it is preferable to use styrene as a monomer unit because it can be polymerized by any of radical polymerization, anionic polymerization and cationic polymerization. These monomers can be polymerized by the known polymerization technology in the presence of a crosslinking agent to provide crosslinked polymers.

When the monomer has a salt functional group, hydrochloric acid, sulfuric acid, phosphoric acid or an organic acid is used as the counter ion to a cationic group, while an alkali metal, ammonia, a lower amine, an alkanolamine or the like is used as the counter ion to an anionic group. Those counter ions can be used each alone or in a combination of two or more species and, but the above is not an exhaustive listing.

The crosslinking agent which can be used in the production of crosslinked polymer particles includes polyfunctional compounds having vinyl, hydroxyl, carboxyl, amino, pyridinium, epoxy, isocyanate, mercapto, aldehyde, acid chloride, acid amide or other groups, and those crosslinking agents can be used each independently or in a combination of two or more species. The crosslinking agent includes but is not limited to aromatic compounds having two or more vinyl groups, such as divinylbenzene, divinyltoluene, divinylxylene, divinylnaphthalene, etc. Among those compounds, divinylbenzene is preferred in view of its high reactivity to vinyl monomers.

The crosslinked polymer particles for use in this third invention are preferably porous. The technology available for the production of porous crosslinked polymer particles typically comprises conducting a suspension polymerization reaction in a mixture comprising a monomer, a crosslinking agent and a solvent which dissolves the monomer but does not dissolve the polymer (non-solvent) and removing the non-solvent from the precipitated polymer for utilizing the ghosts as small pores. The porous crosslinked polymer particles can be used with advantage as chromatographic column packings or various adsorbents in the field of medical care.

The crosslinked polymer particles mentioned above are crosslinked polymer particles having particle diameters within the range of $0.1 \times 10^{-6}$ to $10 \times 10^{-3}$ m, preferably $1 \times 10^{-6}$ to $5 \times 10^{-3}$ m, more preferably $10 \times 10^{-6}$ to $1 \times 10^{-3}$ m. With the crosslinked polymer particles measuring less than $0.1 \times 10^{-6}$ m in diameter, the organic binder fills up the voids between the crosslinked polymer particles of the particle body so that the objective spherical type body of the invention cannot be obtained. Moreover, with crosslinked polymer particles measuring over $10 \times 10^{-3}$ m in diameter, the great dead load of the crosslinked polymer particles prevents the particle body from retaining the conglomerate of crosslinked polymer particles interconnected by the organic binder in the intact interconnected condition so that the objective spherical type body of the invention cannot be obtained.

The standard deviation of the particle diameter distribution of said crosslinked polymer particles is not greater than 100% of the mean particle diameter, preferably not greater than 50%. If the standard deviation exceeds 100%, comparatively smaller crosslinked polymer particles find their way into the minute voids or spaces between the interconnected crosslinked polymer particles to cause a non-uniform distribution of voids, with the result that the favorable functions characteristic of the particle body comprising conglomerate of interconnected particles, which cannot be obtained with the crosslinked polymer particles as such, are not expressed.

The organic binder comprising a non-crosslinked polymer may be a known polymer and includes not only polymers of the monomers mentioned above for the production of said crosslinked polymer particles but also ethylene-vinyl acetate copolymer and its saponification product or chlorination product, polyethylene and its chlorination product, polybutadiene, polyisoprene, styrene-butadiene copolymer, polyvinyl chloride, vinyl chloride-vinyl acetate copolymer, polyurethane, polyethylene, polyethylene oxide, polysulfone, polyamide, polyamideimide, polyimide, cellulose, cellulose acetate, cellulose nitrate, chitosan and its derivatives, melamine resin, epoxy resin and its derivatives, among others. Those binders can be used each independently or in a combination of two or more species and, moreover, the above is not an exhaustive listing. The mode of copolymerization may be any of random, block and graft.

The organic solvent which does not dissolve said crosslinked polymer particles but dissolves said organic binder comprising a non-crosslinked polymer includes but is not limited to ketones such as acetone, methyl ethyl ketone, cyclohexanone, etc.; esters such as methyl acetate, ethyl acetate, butyl acetate, ethyl carbonate, etc.; ethers such as diethyl ether; aromatic hydrocarbons such as toluene, xylene, benzene, chlorobenzene, diethylbenzene, dodecylbenzene, etc.; heterocyclic compounds such as pyridine; saturated hydrocarbons such as hexane, heptane, octane, decane, cyclohexane, etc.; alkyl halides such as methylene chloride, chloroform, carbon tetrachloride, ethylene chloride, etc.; alcohols such as isoamyl alcohol, hexyl alcohol, octyl alcohol, etc.; and other solvents such as 1-nitropropane, dioxane, N,N-dimethylformamide, diethylthioformamide, dimethyl sulfoxide, tetramethylene sulfoxide, acetonitrile, hydroxy-acetonitrile, fumaronitrile, cyanoacetic acid, acetic acid, formic acid, ethylenecarbonate, propylene carbonate, ethylene oxalate, γ-butyrolactone, methylene diisocyanate, tetrahydrofuran, and carbon disulfide. Those solvents can be used each alone or in a combination of two or more species and the above is not an exhaustive listing of the solvents which can be used. The amount of said organic solvent is not particularly restricted but when the organic solvent is used in an excessive amount, it takes a long time for the solvent to be evaporated after immersion and, therefore, it is preferable to use about 1 to 3 volumes of the organic solvent per volume of the precipitated crosslinked polymer particles.

A typical example of production of the spherical type bodies described above is given below.

The spherical type bodies can be produced for example by the following steps I to III.

Step I

This is a step in which crosslinked polymer particles measuring $0.1 \times 10^{6}$ to $10 \times 10^{-3}$ m in diameter with a standard deviation of not greater than 100% of the mean particle diameter are immersed in a solution of an organic binder comprising a non-crosslinked polymer in an organic solvent which does not dissolve said crosslinked polymer particles but dissolves said organic binder.

Step II

This is a step following said Step I, in which the above organic solvent is gradually evaporated off under constant stirring.

Step III

In this step, the crosslinked polymer particles are interconnected through said organic binder precipitating out on the surface of said crosslinkd polymer particles with the progressive reduction in amount of said organic solvent due to evaporation and, at the same time, the resulting conglomerates of interconnected particles are subjected to shearing, tumbling and compaction forces in the course of stirring to provide a substantially spherical type body.

By judicious selection of the kinds and amounts of said crosslinked polymer particles, said organic binder comprising a non-crosslinked polymer, and said organic solvent which does not dissolve said crosslinked polymer particles but dissolves said organic binder comprising a non-crosslinked polymer, there can be obtained a spherical type body having the desired interparticle bond strength and/or a spherical type body in which surface of said crosslinked polymer particles is not covered with the organic binder but remain exposed to the desired extent.

The spherical type bodies comprising the above conglomerates of crosslinked polymer particles according to the invention have the following characteristics.

The first of all is the characteristic that the restriction to the diameter of interconnected constituent crosslinked polymer particles is moderate compared with the prior technology. Thus, while the above spherical type body can be constructed by interconnecting crosslinked polymer particles measuring $0.1 \times 10^{-6}$ to $10 \times 10^{-3}$ m in diameter with a standard deviation of not greater than 100% of the mean particle diameter, there is not a reported case in which crosslinked polymer particles varying in diameter over such a broad range could ever been assembled into spherical type bodies according to one and the same technological principle.

Secondly, the above spherical type body is fundamentally different from the conventional spherical type body in that the surface of the crosslinked polymer particles has an area(s) not covered with an organic binder. Thus, by selecting the amount of an organic binder judiciously, it is possible to have the organic binder distributed exclusively in the voids between the individual crosslinked polymer particles and to cover the surface of the crosslinked polymer particle or leave it exposed in the desired degree. As a result, there can be provided a novel spherical type body in which the constituent crosslinked polymer particles are allowed to express their inherent functions sufficiently without being compromised. Furthermore, when the crosslinked polymer particles are porous particles, the surface porous structure is not covered up but remains a part exposed so that the adsorptive function of the very porous structure is kept intact.

Thirdly, the above spherical type body is superior to the conventional spherical type body in the aspect that the crosslinked polymer particles can be recovered from the spherical type body for reuse. The conventional spherical type body has to be discarded as it is after use. In contrast, the spherical type body of the present invention is such that the organic binder used is soluble in the same organic solvent as used in the construction of the spherical type body so that, after use of the spherical type body, the constituent crosslinked polymer particles can be recovered from the used spherical type body and reuse.

Having the above favorable characteristics, the spherical type body of the invention finds application in a broad variety of uses. For example, the spherical type body can be used as a column packing for liquid chromatography and a stationary phase for gel permeation chromatography in the field of analytical chemistry. Since the spherical type body comprising interconnected crosslinked polymer particles according to the present invention contains interparticle voids, it can be used as the so-called perfusion type body characterized by flows passing through the internal body. Thus, compared with fractional purification in a chromatographic system using the unitary solid crosslinked polymer particles of the comparable diameter as the stationary phase, the objective solute can be separated in a shorter time with the spherical type body of the invention.

The spherical type body of this invention can also be used as the adsorbent in various purification systems in the field of medical care for the purification of body fluids. Here, the substance having an affinity for the target substance which is an etiologic agent in a body fluid may be occurring in the crosslinked polymer particles constituting the spherical type body of the invention, or a substance having an affinity for the target substance may be immobilized after the construction of the spherical type body by interconnecting crosslinked polymer particles. As a further alternative, the substance having an affinity for the target substance may be immobilized after the spherical type body of the invention has been coated with a functional group-containing substance.

The etiologic agent mentioned above includes but is not limited to low-density lipoprotein, endotoxin, $\beta$2-microglobulin, and tumor necrosis factor-$\alpha$.

The substance having an affinity for the etiologic target substance in a body fluid is not restricted provided that it has an affinity for the target substance but includes, among others, substances having negative groups such as sulfo, positive groups such as amino, or hydrophobic groups such as alkyl groups.

Since the spherical type body of the present invention has a perfusion type characteristic, the time required for body fluid purification is expected to be reduced.

The spherical type body of the invention has particle diameters within the range of $1 \times 10^{-6}$ to $100 \times 10^{-3}$ m. Compared with the conventional perfusion type spherical type bodies measuring $50 \times 10^{-6}$ m at most in diameter, it can be implemented in a remarkably broad particle size distribution so that it can be utilized for a detailed investigation of intra-particle flows in the packed column for chromatography, for instance.

The fourth invention is now described in detail.

The adsorbent for purification of body fluids according to this invention comprises a perfusion type carrier on which a substance having an affinity for a target substance has been immobilized.

The perfusion type carrier mentioned above must have flow-through pores having sufficiently large diameters.

In the adsorbent of this invention, in order that the flow through the carrier particle may be created to reduce the height equivalent to a theoretical plate explained in connection with the prior art in this specification, the ratio of the mean particle diameter of said carrier to the mean diameter of flow-through pores in said carrier is preferably not greater than 70 and more preferably not greater than 50.

In addition, because the adsorbent of this invention is intended for purification of a body fluid, it is subject to a certain limit to linear velocity which is specific to the therapy for purification of the particular body fluid. Thus, when a column is packed with the perfusion type carrier of this invention and a solution containing the target substance exclusively is passed at a linear velocity within the range of $1 \times 10^{-4}$ m/s to $10 \times 10^{-4}$ m/s, said height equivalent to a theoretical plate as a carrier characteristic is preferably not greater than 0.5 m, more preferably not greater than 0.1 m.

The following is a representative method for determination of the height equivalent to a theoretical plate. A solution containing the target substance is injected in a pulsating manner through a column packed with the test carrier to construct an elution curve. When the theoretical plate number is large as it is the case with chromatography, the elution curve assumes a Gaussian distribution and the height equivalent to a theoretical plate (HETP) can then be calculated by means of the following equation.

$$HETP = \frac{L}{5.54 \left(\frac{T_r}{W_t}\right)^2}$$

wherein L [m] represents a packed column height, Tr [sec] represents a retention time, and Wt [sec] represents a half-time width. The retention time means the time at which the peak height (top) of the elution curve is detected and the half-time width means the time width corresponding to half of the peak height [F. Guaise: Optimization of Liquid Chromatography, Kodansha, p.18 (1980)].

However, unlike in chromatography, the particle diameter of the adsorbent for purification of body fluids is large and the length of the housing is limited so that the elution curve of a target substance as constructed using the housing packed with the adsorbent for purification of body fluids seldom assumes as Gaussian distribution. In such cases, the shape of the elution curve can be used as a qualitative indicator of the adsorbent performance.

When the mass transfer is insufficient, i.e. the height equivalent to a theoretical plate is large and the theoretical plate number is small, a large proportion of the target substance cannot be brought into sufficient contact with the carrier but be eluted along with the flow of the solution introduced into the housing. Therefore, the peak top position occurs immediately after emergence of that volume of the solution corresponding to the interparticle void volume of the carrier and thereafter the target substance is gradually eluted with the progress of elution time.

On the other hand, when the mass transfer is efficient, i.e. the height equivalent to a theoretical plate is small and the theoretical plate number is large, the better the mass transfer is, the greater the frequency of the target substance contacting the adsorbent is. Therefore, the time during which the target substance remains in the housing is prolonged and the peak immediately following completion of emergence of the volume of the solution corresponding to the interparticle void volume of the adsorbent bed is small and the peak top position is also shifted backwards. Moreover, the elution curve becomes closer to a Gaussian curve.

In the present invention, the geometry of the flow-through pores in said carrier particles need only be such that a portion of the flow in the housing may pass through the carrier particles and the shape and number of pores are not particularly restricted. For example, the cross-sectional configuration may be circular, polygonal or amorphous. Moreover, the flow-through channels within the carrier particles may be linear or curved. In addition, a plurality of flow-through pores preferably exist and the flow-through pores may be similar or different in geometry and extending in parallel or in random directions.

The carrier may have a construction such that when a body fluid flows around it, a flow of the body fluid passing through its interior pores may occur. Moreover, said carrier may be in any of particulate, slab-like and amorphous forms but is preferably particulate from the standpoint of the ease of passage and handling.

The carrier mentioned above is not particularly restricted but may for example be a porous carrier having flow-through pores, a granular carrier manufactured by agglomerating fine particles, a granular carrier manufactured by assembling fibers, or a granular carrier processed to have flow-through pores. The fine particles or fibers for use in the manufacture of said granular carrier are preferably those having small pores receptive to the target substance; i.e. having a large contact area for adsorption. The granular carrier to be processed to have flow-through pores as mentioned above may also preferably be made of a material having a multiplicity of small pores receptive to the target substance even before processed.

The carrier preferably has a sufficient strength so that it will not be compacted to undergo deformation of particles to the extent of interfering with passage of the body fluid.

The technology for manufacturing said carrier includes the method which comprises agglomerating particles to provide flow-through pores, the method which comprises assembling fibers, the method which comprises processing granules or particles to have pores, and so on. As to examples of the method for assembling particles or fibers, there can be mentioned the technique of effecting assembling during a polymerization reaction for producing the particles or fibers and the technique which comprises subjecting only the mutually adjoining surfaces of particles or fibers, without destroying the structure of particles or fibers, to a treatment with an organic solvent, heat, an adhesive, an acid, an alkali, etc. to bond them together. The spaces between the agglomerated particles or fibers constitute flow-through pores. The technology for processing particles to have pores includes laser drilling, solvent leaching and the like.

The material for said carrier includes native macromolecular substances such as cellulose, chitin, chitosan, agarose, etc.; modification products of native substances, such as acylcelluloses, acylchitins, etc.; synthetic polymers such as polystyrene, polymethacrylic acid and its derivatives and their copolymers, polyvinyl alcohol, styrene-divinylbenzene copolymer, etc.; and in organic materials such as glass, alumina, ceramics, and so on.

Furthermore, as said carrier, the perfusion type cellulosic particle body of the second invention or the spherical type bodies comprising crosslinked polymer particles according to the third invention can also be used with advantage.

The target substance mentioned above includes not only the etiologic agents mentioned by way of example in connection with the third invention, but also other lipoproteins which may be causative of atherosclerosis such as very low density lipoproteins; immunoglobulins (A, D, E, G, M), anti-DNA antibodies, anti-acetylcholine receptor-antibodies, anti-blood group antibodies, anti-platelet antibody and other autoantibodies and antigen-antibody complexes; rheumatoid factors, macrophages, invasive carcinoma T-cells, and so on.

The substance having an affinity for said target substance is not particularly restricted provided that it is capable of adsorbing the target substance. Although this has been explained in connection with the third invention, a further discussion seems in the following. Thus, the affinity between a substance having an affinity for a target substance and the target substance is classified into a biological affinity and a physicochemical affinity. The substance exhibiting an affinity for a target substance by way of biological interaction includes a substance on which an antigen has been immobilized, a substance on which an antibody has been immobilized, a substance which utilizes a biological interaction such as complement fixation or Fc coupling, and so on. The substance exhibiting an affinity for a target substance by way of physical interaction includes a substance which utilizes an electrostatic interaction, a substance which utilizes a hydrophobic interaction, and etc. Among them, a substance exhibiting an affinity for the target substance by way of physical interaction is preferred in consideration of availability of materials, stability of the activity during the manufacture, sterilization, storage and transport of the adsorbent and column, and the risk for adverse reactions when contacted with blood.

To describe the substance exhibiting an affinity for the target substance by way of physical interaction in further detail, substances having negative groups can be used for adsorbing low density lipoprotein, for instance. The substances having negative groups include sulfated polysaccharides such as dextran sulfate, heparin sulfate, chondroitin sulfate, chondroitin polysulfate, heparitin sulfate, xylan sulfate, caronin sulfate, cellulose sulfate, chitin sulfate, chitosan sulfate, pectin sulfate, inulin sulfate, arginic acid sulfate, glycogen sulfate, polylactose sulfate, carragenin sulfate, starch sulfate, polyglucose sulfate, laminaran sulfate, galactan sulfate, levan sulfate, mepesulfate, etc.; phosphotungstic acid, polysulfated anethol, polyvinyl alcohol sulfate, polyphosphoric acid, and polyacrylic acid. Among them, sulfated polysaccharides are particularly effective. Further, as favorable examples from clinical points of view, heparin and dextran sulfate can be mentioned.

The above substances having negative groups are examples of the substance exhibiting an affinity for a target substance by way of physical interaction and finding application in the adsorption of low-density lipoprotein but depending on the specific target substance, substances having positive and hydrophobic groups and exhibiting physical interactions can also be used. Moreover, a plurality of different substances each having an affinity for the target substance may be immobilized. Aniline may also be mentioned as an example of said substance having an affinity for the low-density lipoprotein fraction.

The technology for immobilizing said substance having an affinity for the target substance on a carrier or support includes various known methods such as covalent bonding, ionic bonding, physical adsorption, embedding, and insolubilization of precipitation on the surface and those methods can be selectively used according to the particular substance having an affinity for the target substance and the kind of carrier material. In consideration of the loss by release of the substance having an affinity for the target substance in the sterilization procedure, the immobilization by covalent bonding is preferred. If necessary, a spacer may be interposed between the carrier and the substance having an affinity for the target substance.

The technology which can be used to render the carrier reactive to the substance having an affinity for the target substance in the immobilization of said substance having an affinity for the target substance on said carrier by covalent bonding includes the cyanogen halide method, epichlorohydrin method, bis-epoxide method, and bromoacetyl bromide method, among others. As the specific groups which can be used in the above reaction, there can be mentioned amino, carboxyl, hydroxyl, thiol, acid anhydride, succinylimido, chloro, aldehyde, epoxy, tresyl and other groups. From the standpoint of stability in heat sterilization, the epoxy group derived from the epichlorohydrin method is particularly preferred.

The preferred adsorbent for purification of body fluids according to the fourth invention has a mean particle diameter of not less than $100 \times 10^{-6}$ m and a perfusion effect obtained when a housing is packed with this adsorbent and a solution is passed at a linear velocity of not less than $3 \times 10^{-4}$ m/s.

When the above adsorbent for purification of a body fluid is contacted with whole blood, consideration of the possible plugging with blood corpuscles and the dynamic adsorption performance that may be obtained suggests that the particle diameter of the adsorbent is preferably $100 \times 10^{-6}$ m to less than $4000 \times 10^{-6}$ m, more preferably $100 \times 10^{-6}$ m to less than $600 \times 10^{-6}$ m.

When the body fluid to be treated is whole blood, the adsorbent must have a sufficiently large particle diameter for securing pathways for blood corpuscles etc. as compared with the case when a liquid such as plasma is passed. However, when the conventional carrier is used, the diffusion distance increases as the particle diameter is increased, whereby the dynamic adsorptivity of the adsorbent is decreased. This dynamic adsorptivity is particularly poor when the conventional adsorbents of increased particle diameters are used for the treatment of whole blood.

On the other hand, in the adsorbent for purification of a body fluid according to the fourth invention, the carrier produces a perfusion effect so that the mass transfer is improved as compared with the conventional carrier in which the mass transfer of the target substance is solely dependent on diffusion. Therefore, the adsorbent for purification of a body fluids according to this invention within the particle diameter range of $100 \times 10^{-6}$ m to less than $4000 \times 10^{-6}$ m, preferably $100 \times 10^{-6}$ m to less than $600 \times 10^{-6}$ m, shows a remarkably improved dynamic adsorptivity when contacted with whole blood.

The adsorption apparatus comprising a housing packed with an adsorbent for purification of a body fluid which is said perfusion type carrier carrying as immobilized thereon a substance having an affinity for the target substance is also included in the scope of the present invention.

The method of using said adsorption apparatus is similar to that of using the adsorption apparatus for adsorption of a body fluid which is conventionally used in a plasma perfusion system or a direct blood perfusion system. The method can be carried into practice in the conventional manner, for example with sustained injection of an anticoagulant into the body fluid circuit for preventing coagulation of the body fluid and provision of a pressure probe for sensing the occurrence of circuit plugging.

BEST MODE FOR CARRYING OUT THE INVENTION

The following examples are intended to illustrate the present invention in further detail and should by no means be construed as defining the scope of the invention.

EXAMPLE 1

Carboxymethylcellulose (Wako Pure Chemical Ind.) was mixed with 6 N-sodium hydroxide/water (pH=14.8) to prepare a 5.6 weight % aqueous carboxymethylcellulose solution. Then, porous cellulose small particles having a mean diameter of $25 \times 10^{-6}$ m (Chisso Corporation) were mixed with the above carboxymethylcellulose-containing aqueous sodium hydroxide solution (suspension concentration 65 vol. %, the binder fraction 2.0 wt. %) for 5 hours under constant stirring. Then, using a micropipet with a tip diameter of $0.5 \times 10^{-3}$ m, the suspension was dripped into contact with 99.5% ethanol solution, whereby a substantially spherical cellulosic particle body was obtained. The diameter of the particle body was about $0.6 \times 10^{-3}$ to $1 \times 10^{-3}$ m. When this spherical cellulosic particle body was rinsed with pure water and shaken in pure water, the particle body retained its original shape. No deformation of the particle body occurred, either, when the above cellulosic particle body was held between the thumb and the index finger and rolled over a distance of about $5 \times 10^3$ m for 5 reciprocations by rubbing the fingers against each other in the lengthwise direction. The pH value was calculated by means of the equation $pH=-\log_{10}[H^+]$ assuming the degree of dissociation of the aqueous solution of sodium hydroxide and an aqueous solution of HCl=1 and $[H^+] \times [OH^-]=10^{-14}$. The same applies to the pH values given hereinafter.

Figure 3:
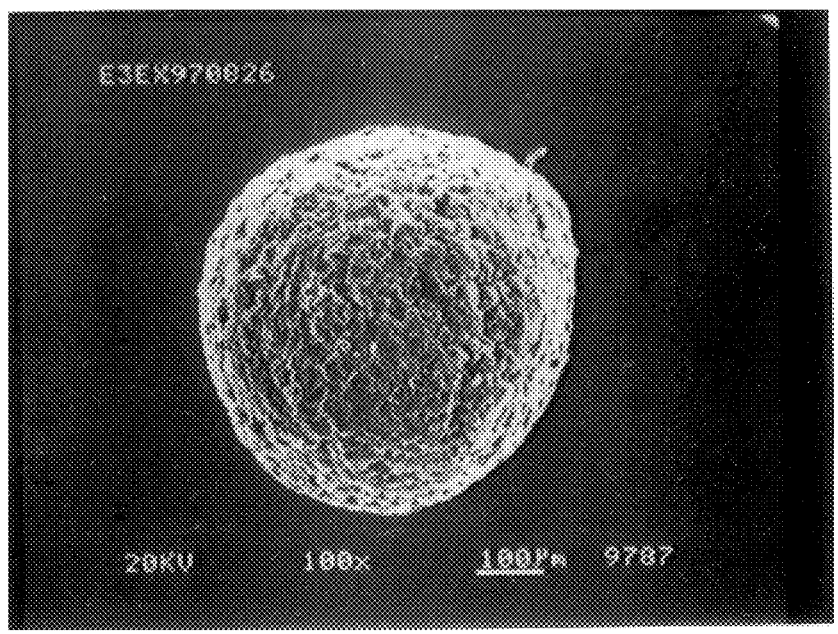
FIG. 3 is a photograph (×100) showing the surface of the cellulosic particle body according to Example 1.
Figure 4:
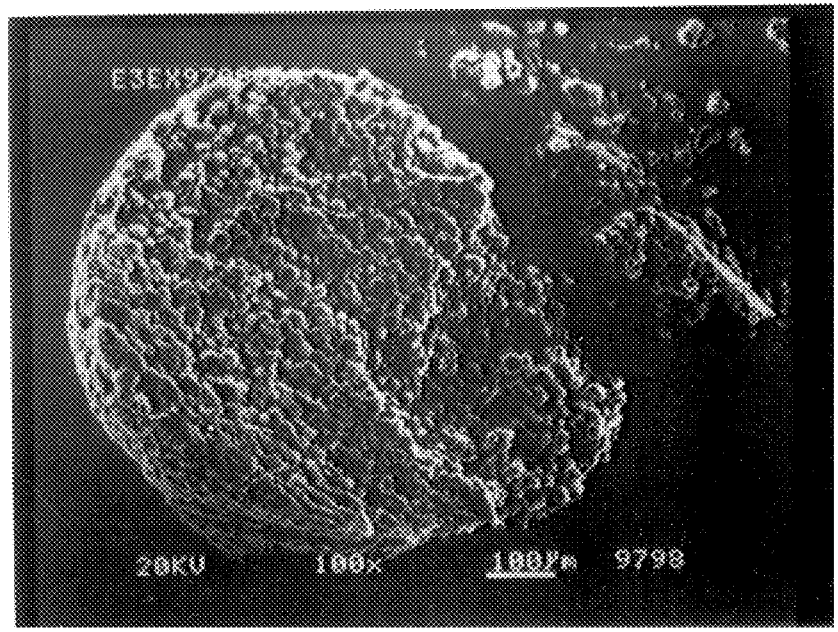
FIG. 4 is a photograph (×100) showing the cross-section of the cellulosic particle body according to Example 1.
Figure 5:
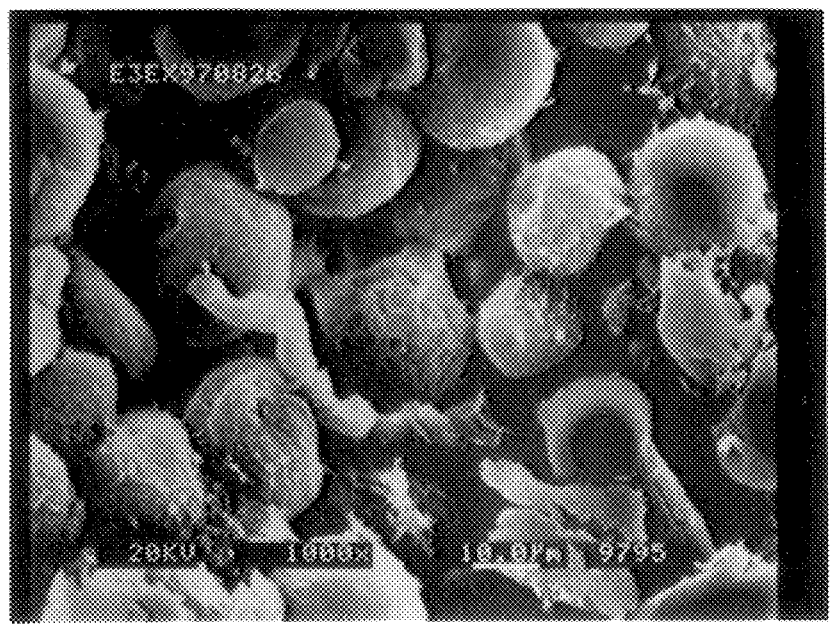
FIG. 5 is a photograph (×100) showing the cross-section of the cellulosic particle body according to Example 1.
Figure 6:
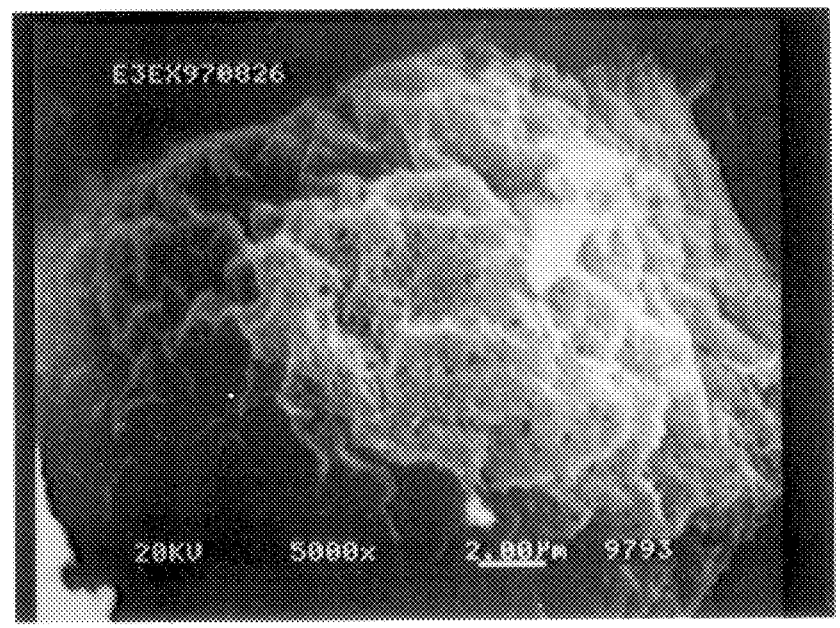
FIG. 6 is a photograph (×5000) showing the cross-section of the cellulosic particle body according to Example 1.

Pure water was substituted for the liquid within the above cellulosic particle body obtained and after ethanol substitution, substitution with 2-methyl-2-propanol was further carried out. The particle body was then lyophilized using a freeze-dryer (Eiko Eng. Co., Ltd.) and after vapor deposition of gold, the lyophilizate was examined with a scanning electron microscope (Topcon). As shown in FIG. 3, the resulting cellulosic particle body was substantially spherical. Furthermore, voids were observed between the interconnected cellulosic small particles as shown in FIGS. 4 and 5. Moreover, as can be seen in FIG. 6, the pores which had existed in the constituent porous cellulosic small particles were still observed even after interconnection.

EXAMPLE 2

A porous cellulosic small particle having a mean particle diameter of $25 \times 10^{-6}$ m (Chisso Corporation) were mixed with 6 N-sodium hydroxide/$H_2O$ (pH=14.8) (suspending concentration 62 vol. %; the binder fraction 0.0 wt. %) for 5 hours with constant stirring. Then, using a micropipet with a tip diameter of $0.5 \times 10^{-3}$ m, the suspension was dripped into contact with 6N-HCl/$H_2O$ (pH=−0.8), whereby a substantially spherical cellulosic particle body was obtained. The diameter of this particle body was about $1 \times 10^{-3}$ m.

The cellulosic particle body obtainable by this production technology, wherein a binder is not used, did not lose its shape even when it was washed with pure water and shaken in pure water. However, this particle body failed to retain its shape when it was held between the thumb and the index finger and rolled over a distance of about $1 \times 10^{-3}$ m by rubbing the fingers against each other in their lengthwise direction.

EXAMPLE 3

Carboxymethylcellulose was mixed with 6N-sodium hydroxide/$H_2O$ (pH=14.8) to prepare a 5.6 wt. % of carboxymethylcellulose solution. Then, a porous cellulose small particle having a mean particle diameter of $25 \times 10^{-6}$ m (Chisso Corporation) was contacted with the above solution of carboxymethylcellulose in sodium hydroxide/$H_2O$ (suspension concentration 63 vol. %, the binder fraction 2.0 wt. %) for 5 hours under constant stirring. Then, using a twin-fluid nozzle means (having an inner and an outer nozzle in concentric relation), compressed nitrogen gas was ejected from the outer nozzle while the above suspension was dispensed in a mist form from the inner nozzle. The delivery rate of nitrogen gas was $3.3 \times 10^{-4}$ m$^3$/s and the dispensing rate of the suspension was $1.1 \times 10^{-7}$ m$^3$/s. The diameter of the inner nozzle of said twin-fluid nozzle means was $2.6 \times 10^{-3}$ m and the diameter of the outer nozzle was $4.4 \times 10^{-3}$ m. The delivery head was 4 m. Using 99.5% ethanol as a coagulation bath, droplets of said suspension were mixed with the bath, whereby the cellulosic particle body of the invention was formed in the coagulation bath. The mean diameter of the particle body was about $2 \times 10^{-4}$ m. When the cellulosic particle body thus obtained was rinsed with pure water and shaken in pure water, each particle body retained its original shape.

Substitution of pure water for the liquid within the cellulosic particle body thus obtained was followed by ethanol substitution and, then, substitution with 2-methyl-2-propanol was carried out. The particle body was then lyophilized with a freeze dryer (Eiko Eng. Co., Ltd.) and after vapor deposition of gold, the particle body was examined using a scanning electron microscope (Topcon). The cellulosic particle body obtained as above was substantially spherical and voids were observed between the interconnected cellulosic small particles. Furthermore, the pores which had been available in the constituent porous cellulosic small particles could be still observed even after interconnection.

EXAMPLE 4

Sodium alginate (Wako Pure Chemical Ind.) was mixed with 6N-sodium hydroxide/$H_2O$ (pH=14.8) to prepare a 3.6 wt. % sodium alginate solution. A porous cellulose small particle having a mean particle diameter of $25 \times 10^{-6}$ m (Chisso Corporation) was contacted with the above sodium alginate solution in NaOH/$H_2O$ (suspension concentration 65 vol. %, the binder fraction 1.3 wt. %) for 6 hours under constant stirring. Then, using a micropipet having a tip diameter of $0.5 \times 10^{-3}$ m, droplets of the above suspension were brought into contact with 6N-calcium chloride/$H_2O$, whereupon a substantially spherical cellulosic particle body was obtained. The diameter of the particle body was about $0.7 \times 10^{-3}$ m. This cellulosic particle body retained its shape even when rinsed with pure water and shaken in pure water. The particle body fully retained its shape even when it was held between the ventral sides of the thumb and index finger and rolled over a distance of about $5 \times 10^{-3}$ m for at least 5 reciprocations by rubbing the fingers against each other in their lengthwise direction.

Figure 7:
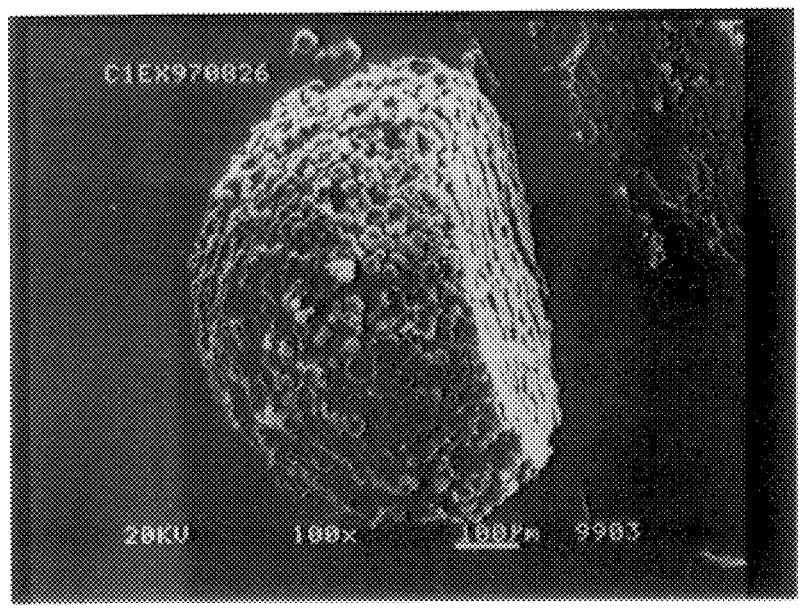
FIG. 7 is a photograph (×100) showing the surface and cross-section of the cellulosic particle body according to Example 3.
Figure 8:
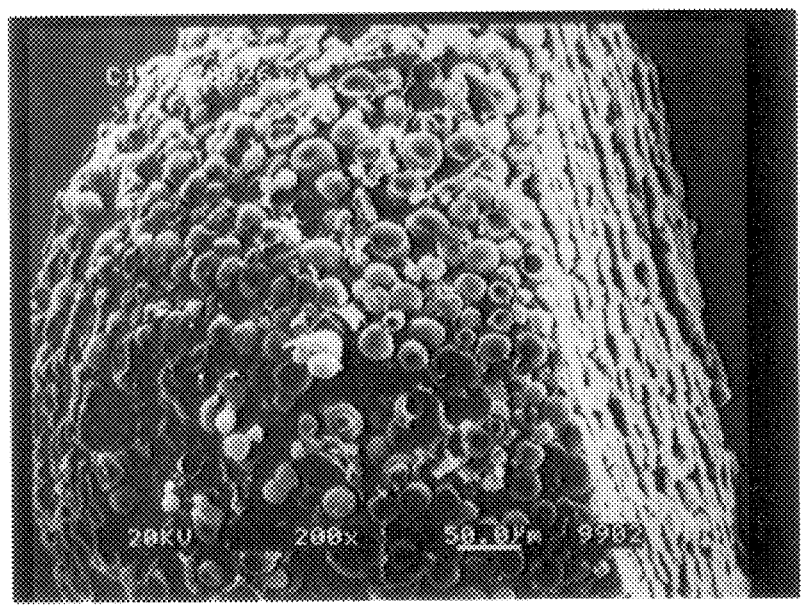
FIG. 8 is a photograph (×200) showing the surface and cross-section of the cellulosic particle body according to Example 3.
Figure 9:
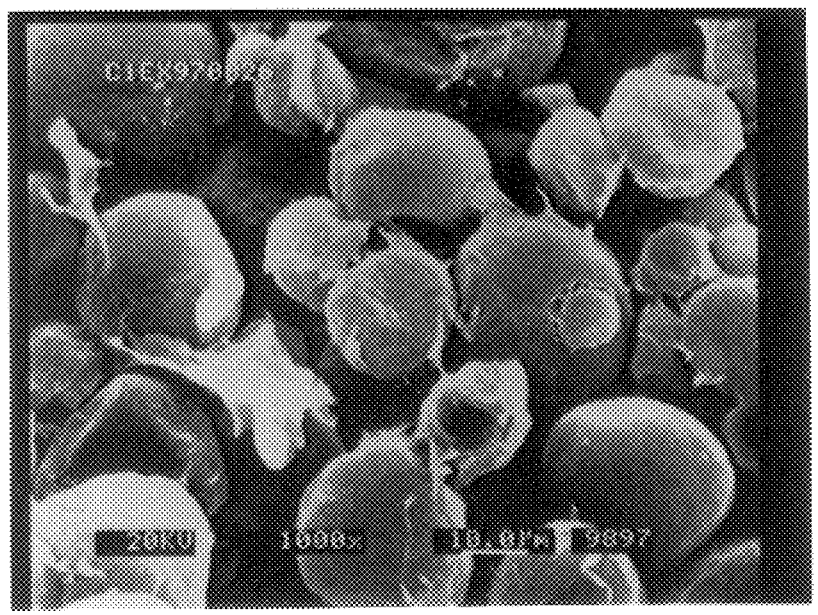
FIG. 9 is a photograph (×1000) showing the surface of the cellulosic particle body according to Example 3.
Figure 10:
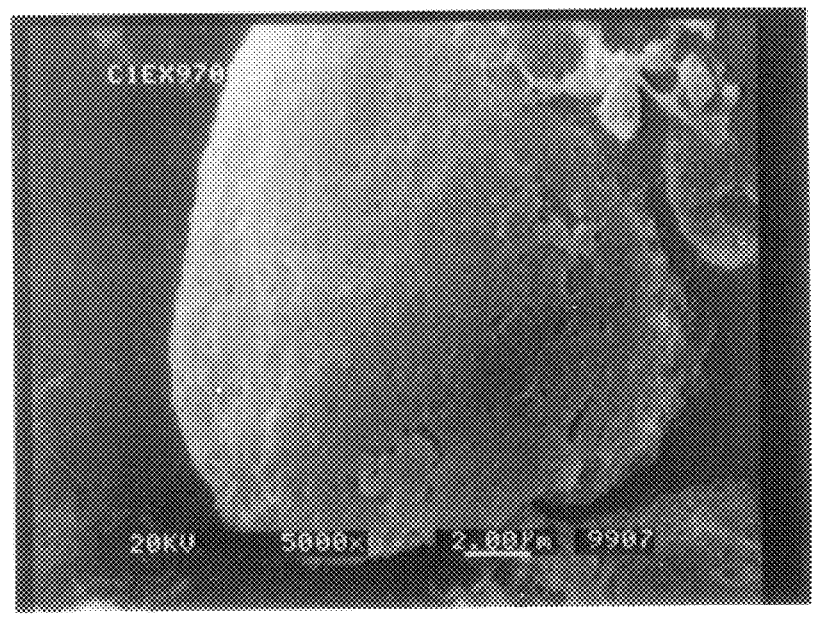
FIG. 10 is a photograph (×5000) showing the cross-section of the cellulosic particle body according to Example 3.

Following substitution of pure water for the liquid within the cellulosic particle body thus obtained, ethanol substitution and, then, substitution with 2-methyl-2-propanol were carried out. It was then lyophilized with a freeze-dryer (Eiko Eng. Co., Ltd.) and, after vapor deposition of gold, examined using a scanning electron microscope (Topcon). As can be seen in FIG. 7, which is a sectional view of the cellulosic particle body, the particle body was substantially spherical. It can also been in FIGS. 8 and 9 that the particle body contained voids between the interconnected constituent cellulosic small particles. Furthermore, as shown in FIG. 10, the pores which had been available within the constituent cellulosic small particles were still observed even after interconnection.

EXAMPLE 5

J Sodium Silicate No. 3 (a concentrated aqueous solution of sodium oxide and silicon dioxide (water glass), Nippon Kagaku Kogyo) was mixed with 6N-sodium hydroxide/$H_2O$ (pH=14.8) to prepare a 30.6 wt. % solution of J Sodium Silicate No. 3. Then, a porous cellulose small particle having a mean particle diameter of $25 \times 10^{-6}$ m (Chisso Corporation) was contacted with the above solution of J Sodium Silicate No. 3 in sodium hydroxide/$H_2O$ (suspension concentration 62 vol. %, the binder fraction 11.6 wt. %) for 6 hours under constant stirring. Then, using a micropipet having a tip diameter of $0.5 \times 10^{-3}$ m, the above suspension was dripped into contact with 6N-calcium chloride/$H_2O$, whereupon a substantially spherical cellulosic particle body was obtained. The diameter of each particle body was about $0.5 \times 10^{-3}$ m. This cellulosic particle body retained its shape fully when rinsed with pure water and shaken in pure water. Moreover, the particle body fully retained its shape even when it was held between the ventral sides of the thumb and index finger and rolled over a distance of about $5 \times 10^{-3}$ m for at least 5 reciprocations by rubbing the fingers against each other in their lengthwise direction.

Following substitution of pure water for the liquid within the cellulosic particle body obtained above, ethanol substitution and substitution with 2-methyl-2-propanol were serially carried out. It was then lyophilized with a freeze-dryer (Eiko Eng. Co., Ltd.) and, after vapor deposition of gold, examined using a scanning electron microscope (Topcon). As a result, the cellulosic particle body was found to be substantially spherical. There also were observed voids between the interconnected cellulosic small particles and, even after interconnection, the pores available in the constituent porous cellulosic small particles were still observed.

EXAMPLE 6

A porous cellulose small particle having a mean particle diameter of $20 \times 10^{-6}$ m (Chisso Corporation) was suspended in 6N-sodium hydroxide/$H_2O$ (pH=14.8) at a final concentration of 70 vol. %. The suspension was thoroughly agitated with a stirrer and using a capillary pipet having a tip diameter of $0.7 \times 10^{-3}$ m, the above suspension was dripped into contact with 5N-HCl/$H_2O$ (pH=−0.7), whereupon a cellulosic particle body was obtained.

The diameter of each particle body was about $2 \times 10^{-3}$ m. The cellulosic particle body thus obtained was rinsed with pure water.

Figure 11:
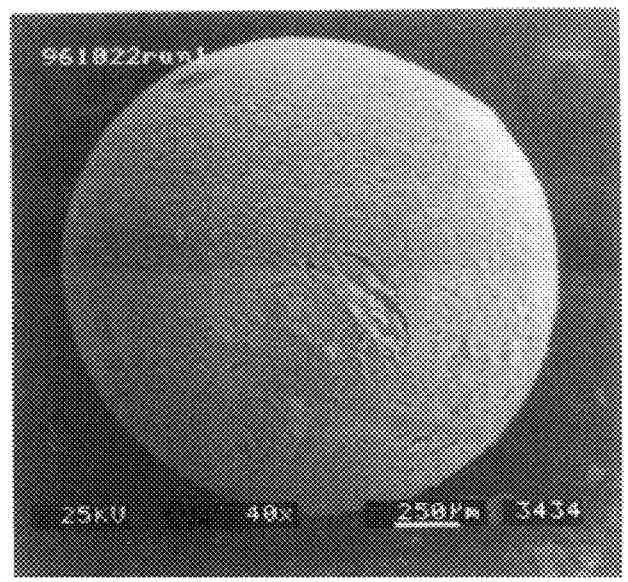
FIG. 11 is a photograph (×40) showing the surface of the cellulosic particle body according to Example 6.
Figure 12:
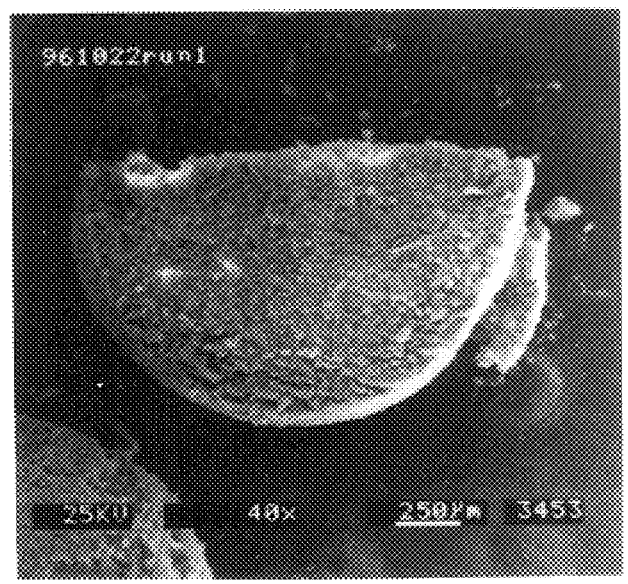
FIG. 12 is a photograph (×40) showing the cross-section of the cellulosic particle body according to Example 6.
Figure 13:
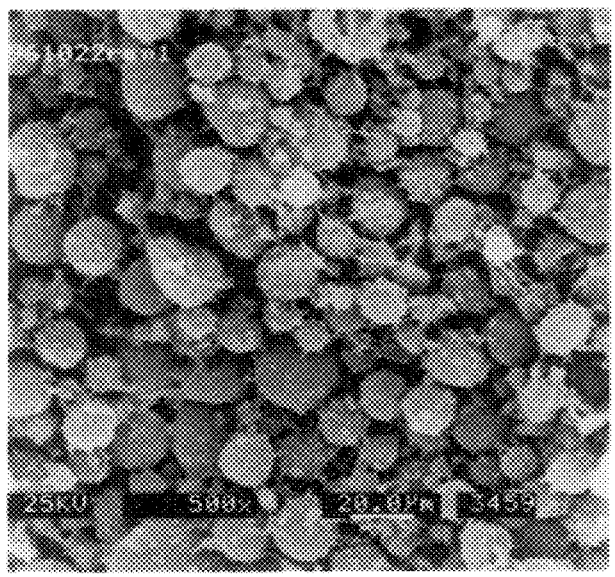
FIG. 13 is a photograph (×500) showing the cross-section of the cellulosic particle body according to Example 6.
Figure 14:
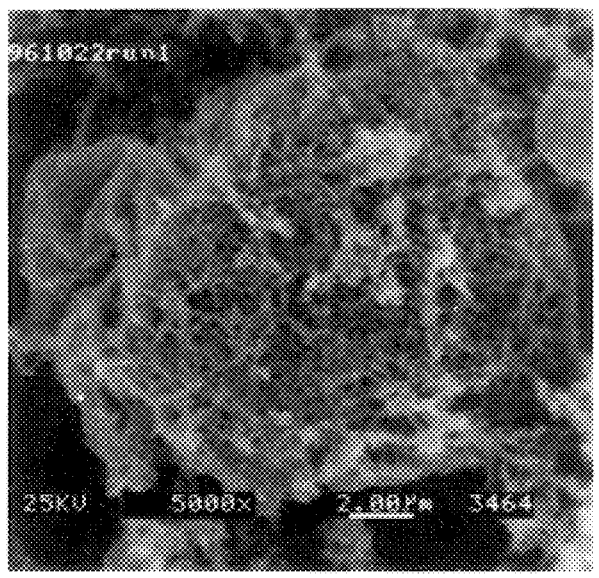
FIG. 14 is a photograph (×5000) showing the cross-section of the cellulosic particle body according to Example 6.

Following substitution of ethanol for the liquid within the above cellulosic particle body, substitution with 2-methyl-2-propanol was carried out. The particle body was then lyophilized using a freeze-dryer (Eiko Eng. Co. Ltd.) and, after vapor deposition of gold, the lyophilizate was examined with a scanning electron microscope (Topcon). As a result, this cellulosic particle body was found to be substantially spherical as shown in FIG. 11. In addition, as is evident in FIG. 13, there were voids between the interconnected cellulosic small particles. Furthermore, the pores available in the constituent porous cellulosic small particles were still observed even after interconnection as shown in FIG. 14.

COMPARATIVE EXAMPLE 1

A porous cellulosic small particle having a mean particle diameter of $20 \times 10^{-6}$ m was suspended in pure water at a final concentration of 70 vol. %. The suspension was thoroughly agitated with a stirrer and using a capillary pipet having a tip diameter of $0.7 \times 10^{-3}$ m, the suspension was dripped into contact with 5N-HCl/$H_2O$ (pH=−0.7), whereupon the cellulose particles were simply dispersed.

COMPARATIVE EXAMPLE 2

A porous cellulosic small particle having a mean particle diameter of $20 \times 10^{-6}$ m (Chisso Corporation) was suspended in 6N-sodium hydroxide/$H_2O$ (pH=14.8) at a final concentration of 70 vol. %. After thorough agitation with a stirrer, the suspension was dripped from a capillary pipet with a tip diameter of $0.7 \times 10^{-3}$ m into contact with pure water, whereupon disk-shaped masses of cellulose were obtained. Upon shaking, the disks collapsed to give a dispersion of discrete cellulose particles.

COMPARATIVE EXAMPLE 3

A porous cellulose small particle having a mean particle diameter of $20 \times 10^{-6}$ m (Chisso Corporation) was suspended in 6N-sodium hydroxide/$H_2O$ (pH=14.8) at a final concentration of 40 vol. %. The suspension was thoroughly agitated with a stirrer and using a capillary pipet with a tip diameter of $0.7 \times 10^{-3}$ m, droplets of the suspension were mixed with 5N-HCl/$H_2O$ (pH=−0.7), whereupon fragment-like masses of cellulose were obtained. When shaken, those masses collapsed, giving a dispersion of discrete cellulose particles.

COMPARATIVE EXAMPLE 4

A porous cellulose small particle having a mean particle diameter of $20 \times 10^{-6}$ m (Chisso Corporation) was suspended in 6N-sodium hydroxide/$H_2O$ (pH=14.8) at a final concentration of 80 vol. %. The suspension was thoroughly agitated with a stirrer and using a capillary pipet with a tip diameter of $0.7 \times 10^{-3}$ m, the suspension was dripped into contact with 5N-HCl/$H_2O$ (pH=−0.7). As a result, smooth-surfaced droplets could not be formed but the resulting cellulosic masses were massive form.

EXAMPLE 7

A porous cellulose small particle with a mean particle diameter of $20 \times 10^{-6}$ m (Chisso Corporation) was suspended in 6N-sodium hydroxide/$H_2O$ (pH=14.8) at a final concentration of 70 vol. % and the resulting suspension was agitated well with a stirrer. Using a twin-fluid nozzle means (having an inner and an outer nozzle in concentric relation), compressed nitrogen gas was ejected from the outer nozzle while the above suspension was dispensed from the inner nozzle. The nitrogen ejection pressure was $5 \times 10^3$ kg/$m^2$ and the suspension dispersing speed was $5.19 \times 10^{-4}$ $m^3$/S. The diameter of the inner nozzle of the above twin-fluid nozzle means was $2.6 \times 10^{-3}$ m and the diameter of the outer nozzle was $4.4 \times 10^{-3}$ m. The delivery head was 4 m. As a result, the objective cellulosic particle body was obtained in an acidic solution. The mean particle body diameter was about $200 \times 10^{-6}$ m.

Figure 15:
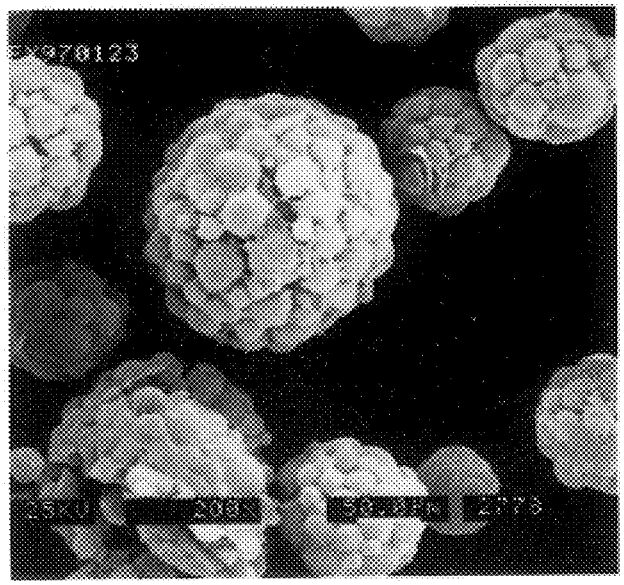
FIG. 15 is a photograph (×200) showing the surface of the cellulosic particle body according to Example 7.
Figure 16:
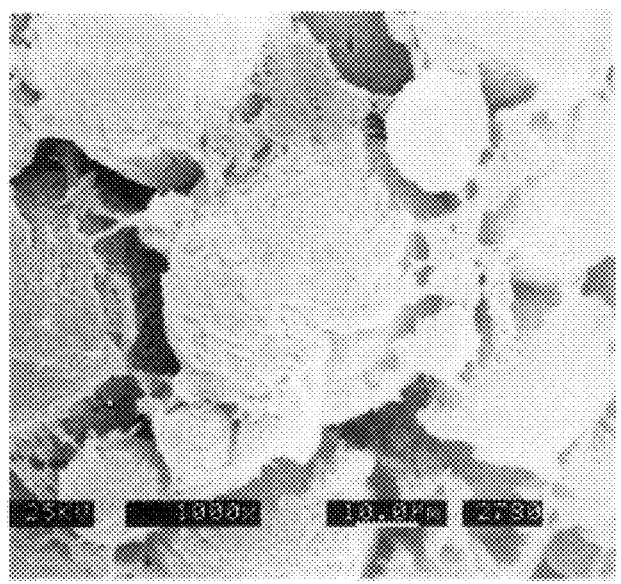
FIG. 16 is a photograph (×1000) showing the surface of the cellulosic particle body according to Example 7.
Figure 17:
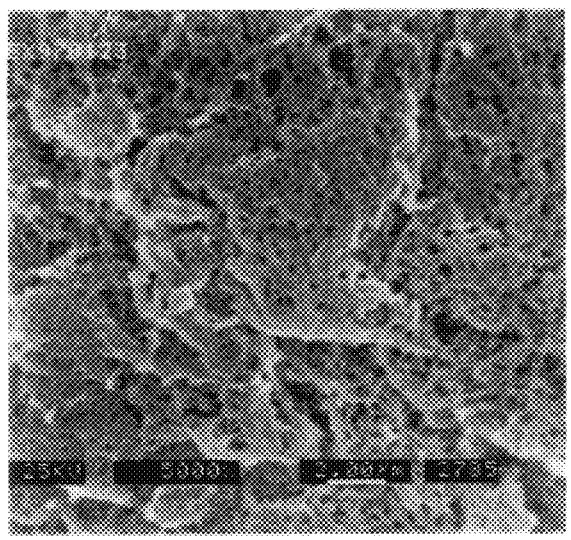
FIG. 17 is a photograph (×5000) showing the surface of the cellulosic particle body according to Example 7.

Following substitution of ethanol for the liquid within the above cellulosic particle body, substitution with 2-methyl-2-propanol was carried out. It was then lyophilized with a freeze-dryer (Eiko Eng. Co., Ltd.) and, after vapor deposition of gold, the particle body was examined using a scanning electron microscope (Topcon). As shown in FIG. 15, this cellulosic particle body was spherical. As can be seen in FIG. 16, voids were available between the interconnected cellulosic small particles. It can also be seen in FIG. 17 that the pores originally available in the constituent cellulose particles were still evident after interconnection.

COMPARATIVE EXAMPLE 5

Figure 18:
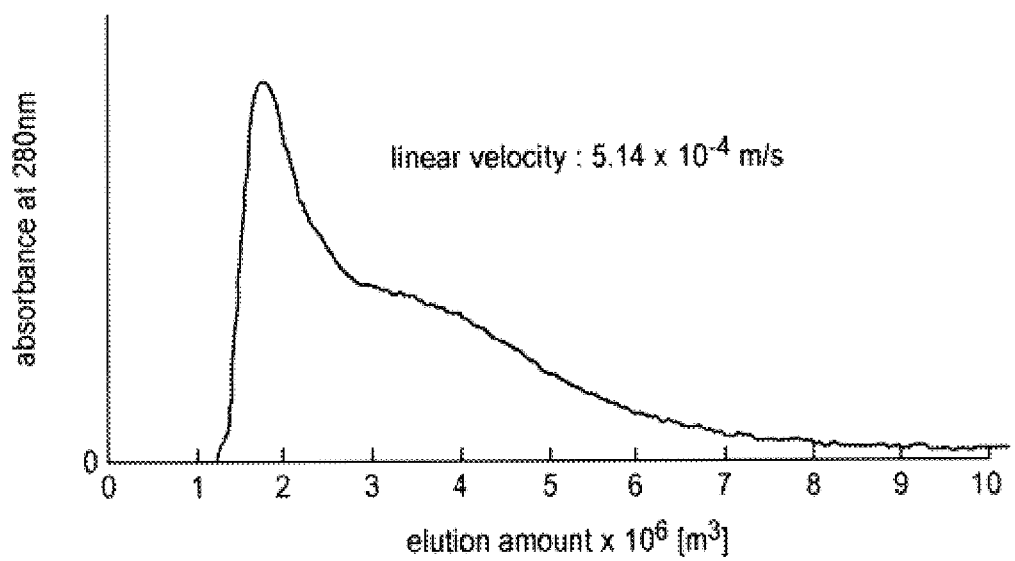
FIG. 18 is an elution curve of low-density lipoprotein in Comparative Example 5.

A column (in. dia. 0.01 m, 0.05 m long) was packed with a porous cellulosic small particle (mean particle diameter $179 \times 10^{-6}$ m) (Chisso Corporation) which is of the same structure (e.g. pore diameter) as the cellulose particles used in Examples 6 and 7 and Comparative Examples 1 to 4 but different in mean particle diameter. Then, physiological saline at 23.2°C (Otsuka Pharmaceutical Co.) was passed through the column at a linear velocity of about $5 \times 10^{-4}$ m/s and $100 \times 10^{-9}$ m$^3$ of a 5-fold dilution of a low-density lipoprotein reagent (L-2139, SIGMA) in physiological saline was injected in a pulsating manner. The time course of change in the concentration of low-density lipoprotein was monitored with an absorptiometer (ATTO) at the wavelength of 280 nm. As shown in FIG. 18, the peak top was confirmed to occur in the position immediately following the beginning of elution. The cellulosic particles used had pores receptive to the low-density lipoprotein. Therefore, the above characteristics of the elution curve were not attributable to the absence of pores through which low-density lipoprotein could enter the cellulosic particle body but rather attributable to the fact that because the particle size of the particle body was large, the mass transfer distance was long and, therefore, the low-density lipoprotein could not migrate sufficiently within the cellulosic particle body but was eluted out from the column exit together with the flow down in the interstices of the cellulosic packing.

EXAMPLE 8

Figure 19:
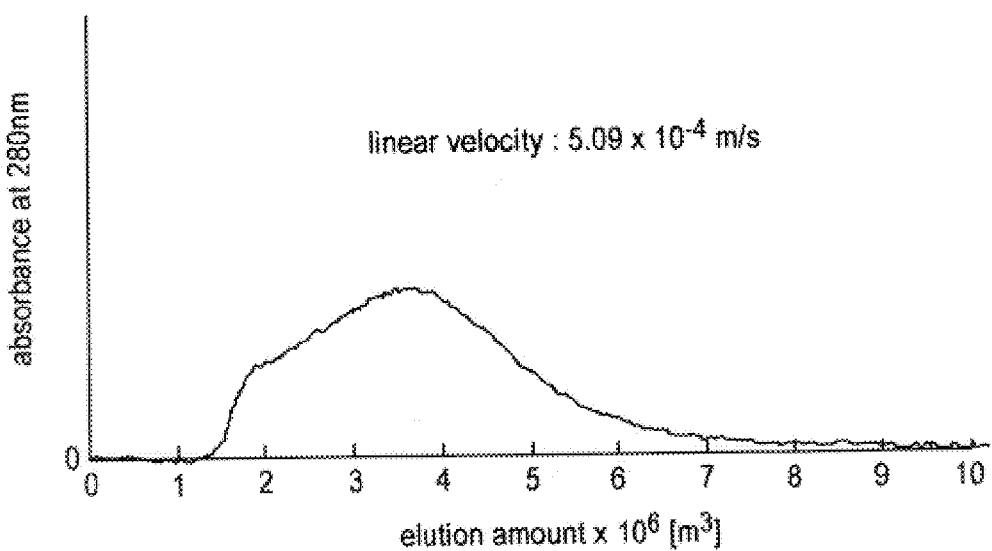
FIG. 19 is an elution curve of low-density lipoprotein in Example 8.

A column (0.01 m in. dia., 0.05 m long) was packed with the particle body obtained in Example 7 (the mean diameter ca $200 \times 10^{-6}$ m, the ratio of the mean diameter of the cellulosic particle body to the mean diameter of cellulosic small particles=10). Physiological saline (Otsuka Pharmaceutical Co.) at 23.2° C. was passed at a linear velocity of about $5 \times 10^{-4}$ m/s and $100 \times 10^{-9}$ m$^3$ of a 5-fold dilution of a low-density lipoprotein reagent (L-2139, SIGMA) in physiological saline was injected in a pulsating manner. The time course of change in the concentration of low-density lipoprotein was monitored with an absorptiometer (ATTO) at the wavelength of 280 nm. As shown in FIG. 19, the peak top position was delayed as compared with Comparative Example 5. The particle body used in this example was a perfusion type particle body (particle body diameter ca $200 \times 10^{-6}$ m) comprising cellulose particles (particle diameter $20 \times 10^{-6}$ m) having pores similar to those of the cellulose small particle (particle diameter $179 \times 10^{-6}$ m) used in Comparative Example 5. Therefore, the above elution curve was obtained because, even though the particle diameter of the particle body was large, its perfusion structure insured a faster mass transfer for low-density lipoprotein within the particle body so that the low-density lipoprotein could migrate easily within the particle body.

EXAMPLE 9

As the crosslinked polymer particles, the divinylbenzene-crosslinked polystyrene carrier HP21 from Mitsubishi Chemical Co. (Synthetic adsorbent Diaion™ HP21) was used. This HP21 was dried at room temperature and classified through standard sieves, and a fraction measuring $350 \times 10^{-6}$ to $425 \times 10^{-6}$ m with a standard deviation of 29% of the mean particle diameter was used. As the organic binder, Styron™ (Asahi Kasei Polystyrene, Grade G8102, Color No. K27, particle size 71) was used. Methyl ethyl ketone was used as the organic solvent which does not dissolve crosslinked polymer particles but dissolves the organic binder.

The above HP21 in an amount of 16.6 g was put in a 100 ml beaker measuring 5 cm in diameter and stirred using a mixer (EYELA D. C. STIRRER DOL-RT, Type DCL-2RT; Tokyo Rika Kikai K. K.) with a 3-blade impeller (4.9 cm dia.) inserted into the beaker in contact with its bottom. The number of revolutions was 50 rpm. To crush and trim the coarse lumps formed in the above stirring granulation, stirring at 500 rpm was further carried out for 1 minute. The rotational speed of the impeller was controlled with a slidac (Yamabishi Electric Co., Ltd., BS-130-100MC) connected to said stirring mixer.

Then, under constant stirring, 31 ml of a solution of Styron™ in methyl ethyl ketone (13 mg/ml) was added. While the stirring was continued, methyl ethyl ketone was removed by means of draft suction and a dryer (cold air). The yield of the spherical type bodies thus obtained was about 5 weight %. The spherical type bodies were so tough that they did not collapse under finger pressure.

Figure 20:
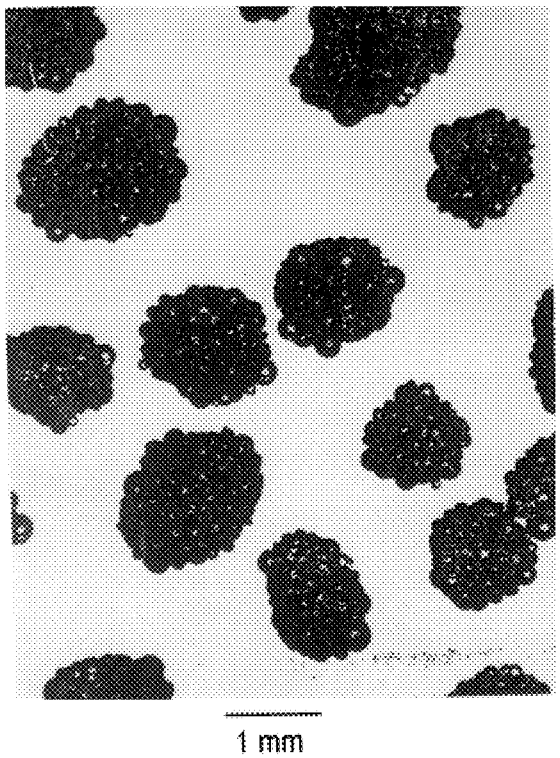
FIG. 20 is a photograph (×12) showing the surface of the spherical type body according to Example 9.
Figure 21:
FIG. 21 is a photograph (×200) showing the surface of the spherical type body according to Example 9.

FIG. 20 is a light microphotograph [SMZ-10 (Nikon)] showing the particulate structure of the spherical type body. The spherical type body was immobilized on a sample station with an electroconductive tape and subjected to gold/palladium vapor deposition. A scanning electron microphotograph of the spherical type body surface [ABT-32 (Topcon)] is shown in FIG. 21. It will be apparent from FIG. 21 that the surface of the spherical type body showed two areas, namely the organic binder area and the HP21 surface area. Thus, the presence of the exposed surface areas of crosslinked polymer particles which were not covered with the organic binder could be confirmed. Moreover, on the section of the spherical type body, voids were observed between crosslinked polymer particles and, in addition, the presence of the organic binder in the interconnecting parts of the adjoining crosslinked polymer particles could be confirmed. The above findings indicated that on both the surface and the section, voids existed between the crosslinked polymer particles.

EXAMPLE 10

Carboxymethylcellulose (Wako Pure Chemical Ind. Co.) was mixed with 6N-NaOH/H$_2$O to prepare a 2.9 wt. % carboxymethylcellulose solution. A porous cellulose small particle with a mean particle diameter of $25 \times 10^{-6}$ m (Chisso Corporation) was suspended in the above aqueous carboxymethylcellulose-NaOH solution (the percentage of the total volume of cellulose particles relative to the volume of the suspension=65 vol. %; the percentage of the weight of carboxymethylcellulose relative to the weight of the suspension=1.0 wt. %) for 5 hours under constant stirring. Then, using a twin-fluid nozzle means (having an inner and an outer nozzle in concentric relation), compressed nitrogen gas was ejected from the outer nozzle while the above suspension was dispensed from the inner nozzle into a coagulation bath of 99.5% ethanol to trap therein. The nitrogen gas ejection speed was $3.3 \times 10^{-4}$ m$^3$/s and the suspension dispensing speed was $1.2 \times 10^{-7}$ m$^3$/s. The diameter of the inner nozzle of the twin-fluid nozzle means was $2.6 \times 10^{-3}$ m, while the diameter of the outer nozzle was $4.4 \times 10^{-3}$ m. The discharging head was 4 m. The carrier thus obtained was rinsed with pure water and wet-classified through $180 \times 10^{-6}$ m and $355 \times 10^{-6}$ m sieves to provide a carrier having a mean particle diameter of $256 \times 10^{-6}$ m.

Figure 22:
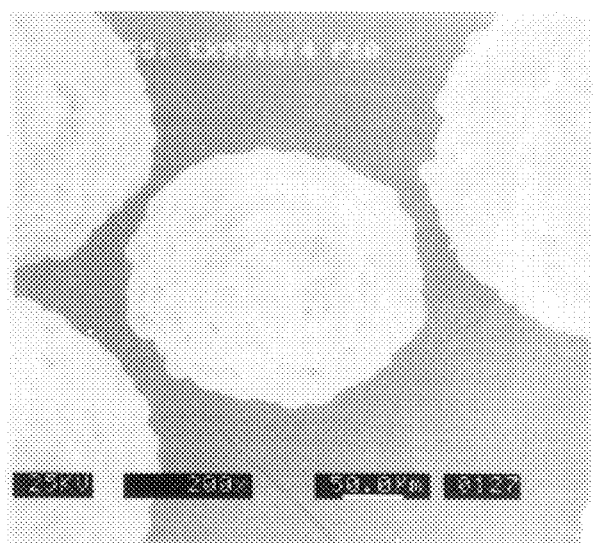
FIG. 22 is a photograph (×200) showing the surface of the carrier according to Example 10.
Figure 23:
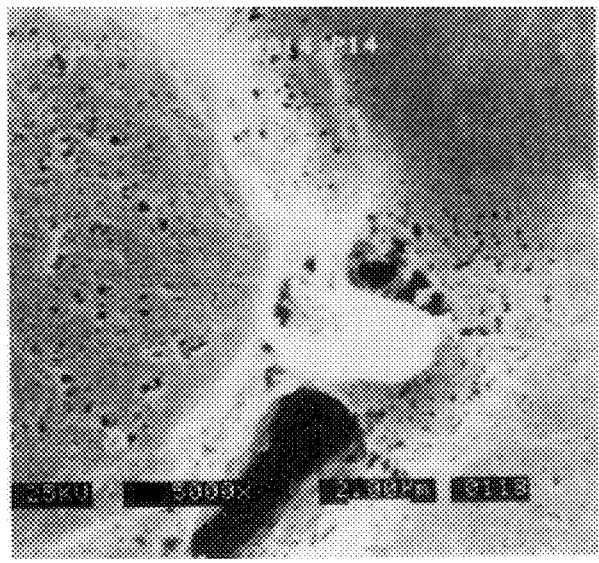
FIG. 23 is a photograph (×5000) showing the surface of the carrier according to Example 10.
Figure 24:
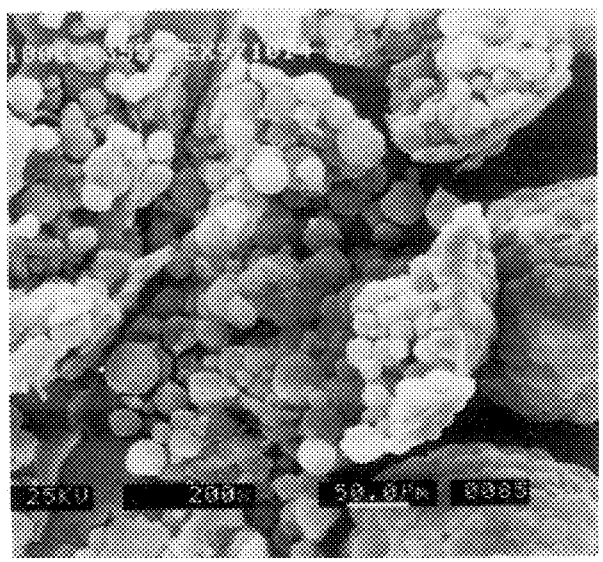
FIG. 24 is a photograph (×200) showing the cross-section of the carrier according to Example 10.
Figure 25:
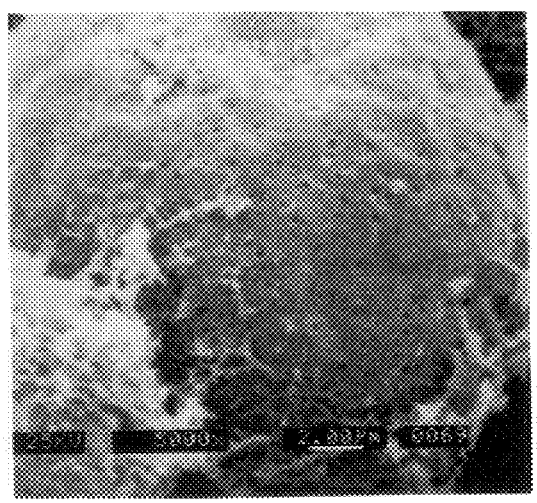
FIG. 25 is a photograph (×5000) showing the cross-section of the carrier according to Example 10.

After substitution of ethanol for the liquid within the carrier, substitution with 2-methyl-2-propanol was carried out and the carrier was then lyophilized (Eiko Eng. Co., Ltd.). After vapor deposition of gold, the lyophilized carrier was examined using a scanning electron microscope (Topcon). As shown in FIGS. 22 and 24, the surface and cross-section of the carrier presented with voids (flow-through pores) between the interconnected cellulose particles. Moreover, as shown in FIGS. 23 and 25, small pores (adsorptive pores) could be observed on both the surface and cross-section of the carrier. The carrier thus obtained had flow-through pores and small spores available for adsorption, thus having a structure such that internal flows occur when there is a flow around it.

REFERENCE EXAMPLE 1
Determination of the Upper-Limit Linear Velocity

A column having an internal diameter of $10 \times 10^{-3}$ m and a length of $110 \times 10^{-3}$ m was packed with the carrier obtained in Example 10 (mean particle diameter $256 \times 10^{-6}$ m), and fresh bovine blood supplemented with citric acid as an anticoagulant and maintained at 37° C. was passed through the column. The blood was introduced at a constant linear velocity and when the pressure loss became steady, a change was made to a higher linear velocity. In this manner, the upper-limit linear velocity at which the pressure loss became constant was determined. As a result, the upper-limit linear velocity was found to be $7.32 \times 10^{-4}$ m/s.

COMPARATIVE REFERENCE EXAMPLE 1
Determination of the Upper-Limit Linear Velocity Using the commercial carrier POROS™ (Perceptive Biosystems; mean particle diameter ca $50 \times 10^{-6}$ m), fresh bovine blood was passed and the upper-limit linear velocity at which the pressure loss could be kept constant was determined as in Reference Example 1. As a result, even at the initial linear velocity level of $0.75 \times 10^{-4}$ m/s, the pressure loss did not become steady but continued to rise and ultimately the packed column was plugged with the blood. The experiment was discontinued.

COMPARATIVE REFERENCE EXAMPLE 2
Determination of the Upper-Limit Linear Velocity Using a porous cellulose carrier (Chisso Corporation; mean particle diameter $220 \times 10^{-6}$ m) which was similar to the cellulose particles used in Example 10 (mean diameter $25 \times 10^{-6}$ m) in pore geometry but larger in mean particle diameter, fresh bovine blood was passed and the upper-limit linear velocity at which the pressure loss could be kept steady was determined as in Reference Example 1. As a result, the upper-limit linear velocity was found to be $5.78 \times 10^{-4}$ m/s.

As can be understood from Comparative Reference Example 1, POROS™ as a commercial perfusion type carrier was small in particle diameter so that direct blood perfusion was difficult. On the other hand, the carrier obtained in Example 10 had a higher upper-limit linear velocity at which the pressure loss could be maintained as can be seen from Reference Example 1. When blood was passed through the column conventionally used in the purification of body fluids ($400 \times 10^{-6}$ m$^3$ in volume and $110 \times 10^{-3}$ m long) at a linear velocity of $7.32 \times 10^{-4}$ m/s, the flow rate was $2.66 \times 10^{-6}$ m$^3$/s (159 ml/min), which falls within the therapeutic range ($0.833 \times 10^{-6}$ to $3.33 \times 10^{-6}$ m$^3$/s (50 to 200 ml/min).

REFERENCE EXAMPLE 2
Determination of the Elution Curve

Figure 26:
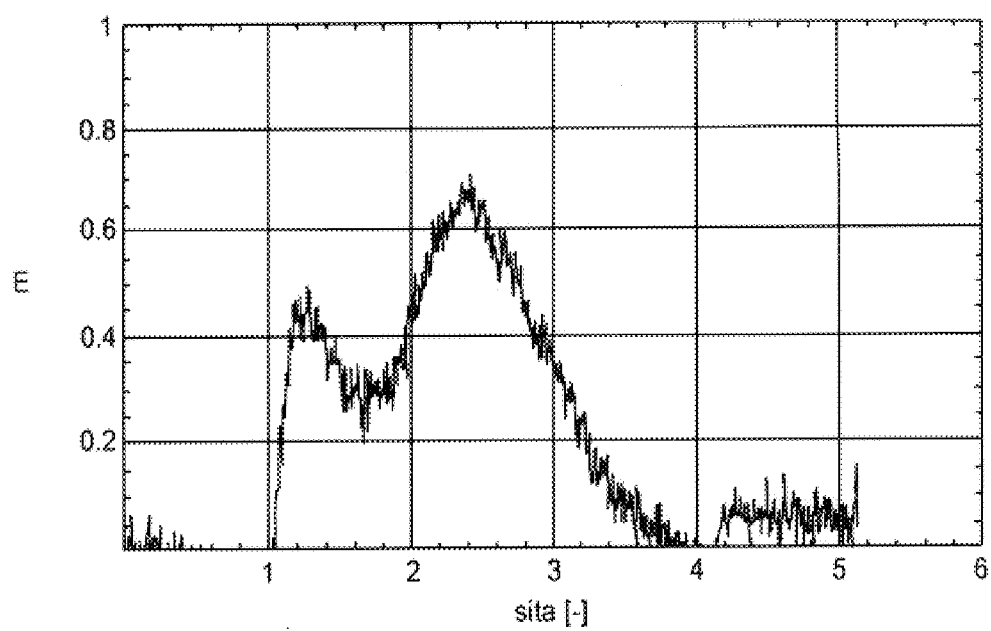
FIG. 26 is an elution curve of low-density lipoprotein in Reference Example 2.

A column (0.01 m in. dia., 0.20 m long) was packed with the carrier obtained in Example 10 (mean particle diameter ca $256 \times 10^{-6}$ m the ratio of the mean diameter of the carrier to the mean diameter of cellulose particles=10). Then, physiological saline (Otsuka Pharmaceutical Co.) at 23.2° C. was passed at a linear velocity of about $4.6 \times 10^{-4}$ m/s and $100 \times 10^{-9}$ m of a 5-fold dilution of a low-density lipoprotein reagent (SIGMA, L2139) in physiological saline was injected in a pulsating manner. The time course of change in the concentration of low-density lipoprotein in the eluate was monitored with an absorptiometer (ATTO) at the wavelength of 280 nm. The resulting elution curve is shown in FIG. 26. The "sita" on the abscissa represents the percentage of the amount of elution relative to the internal void volume of the carrier and "E" on the ordinate represents the solute concentration obtained by transformation so that the total integral area of the elution curve would be equal to 1. FIG. 26 shows two peaks. The first peak top is situated immediately following completion of emergence of the solution corresponding to the internal void volume of the carrier (sita=1) and this peak height was small.

When albumin (mol. wt. $6.6 \times 10^4$) was injected under the same conditions as in Reference Example 2, the peak top was situated at "sita"=ca 1.8. Since peaks of an elution curve in the absence of adsorption are such that a sbstance having a larger molecular weight emerges earlier, the above result indicates that the first peak corresponds to low-density lipoprotein which has a large molecular weight (mol. wt. $300 \times 10^4$ to $500 \times 10^4$).

COMPARATIVE REFERENCE EXAMPLE 3
Determination of the Elution Curve

Figure 27:
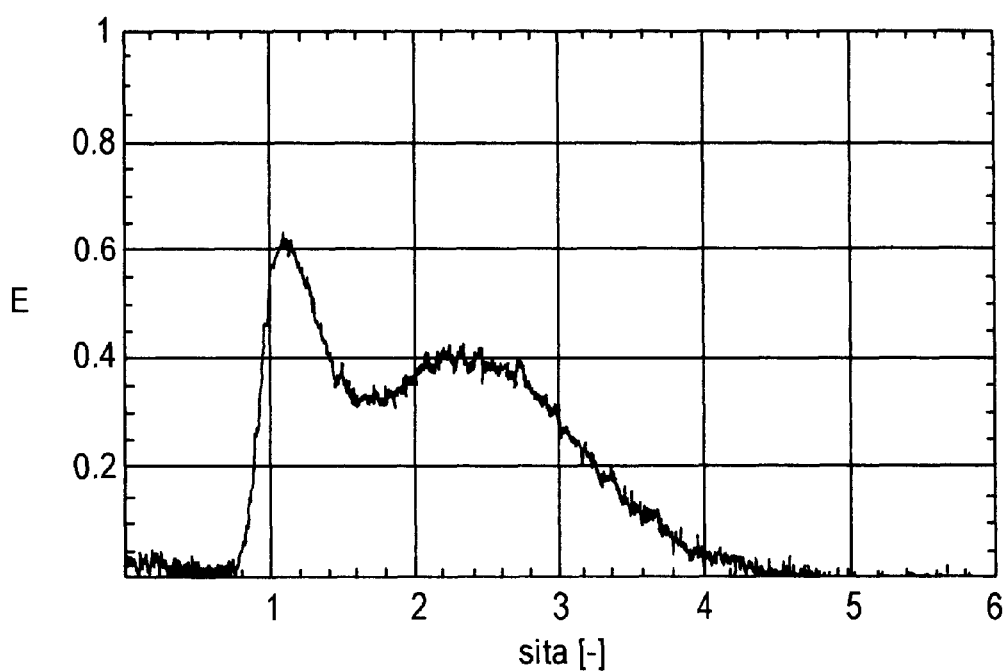
FIG. 27 is an elution curve of low-density lipoprotein in Comparative Reference Example 3.

Using the carrier of Comparative Reference Example 2 (Chisso Corporation; mean particle diameter $220 \times 10^{-6}$ m), the elution curve of low-density lipoprotein was determined under conditions similar to those used in Reference Example 2. The elution curve thus determined is shown in FIG. 27. The first peak top occurred immediately following completion of emergence of the volume of the solution corresponding to the interparticle void volume of the carrier and its peak height was large.

With reference to the results in Reference Example 2 and Comparative Reference Example 2, the shape of the elution curve in Reference Example 2 featured a smaller height of the first peak and trailing as a whole as compared with the curve obtained in Comparative Reference Example 3. It is, therefore, clear that the carrier of Example 10 (mean particle diameter $256 \times 10^{-6}$ m) is superior to the carrier of Comparative Reference Example 3 (mean particle body diameter $220 \times 10^{-6}$ m) with a better mass transfer characteristic.

It is supposed that despite its having a larger mean particle diameter than the carrier of Comparative Reference Example 3, the carrier of Example 10 produces a perfusion effect resulting from the presence of flow-through pores, thus contributing to a faster mass transfer of low-density lipoprotein within the carrier.

Referring to the elution curves of Reference Example 2 and Comparative Reference Example 3, the occurrence of the peak of low-density lipoprotein immediately following completion of emergence of the volume of the solution corresponding to the interparticle void volume is not attributable to the absence of pores providing access to the interior of the carrier but attributable to the fact that because of the larger particle size of the carrier, the distance of mass transfer is larger so that the low-density lipoprotein does not come into sufficient contact with the carrier particles but emerges out of the column along with the flow down in the interparticle passages of the column packing. The cellulosic small particles constituting the carrier used in Reference Example 2 (mean particle diameter $25 \times 10^{-6}$ m) and the carrier of Comparative Reference Example 3 (mean particle diameter $220 \times 10^{-6}$ m) are similar to each other in pore geometry and receptive to low-density lipoprotein. The fact that low-density lipoprotein may enter into those pores has been confirmed by the successful adsorption of low-density lipoprotein using the carrier of Example 10 in Examples 11 and 12.

EXAMPLE 11

The carrier obtained in Example 10 was reacted with epichlorohydrin at 45° C. for 2 hours and, then, reacted with dextran sulfate at 40° C. for 24 hours to provide an adsorbent with dextran sulfate immobilized thereon.

The above adsorbent was added to fresh human serum in a ratio of 1 volume, as sediment, to 6 volumes of the serum and the mixture was shaken at 37° C. for 10 hours. The concentration of the supernatant was then measured to calculate the adsorption rate.

Adsorption rate (%)=(concentration of initial liquid−concentration of supernatant)/concentration of initial liquid×100

The adsorption rates of low-density lipoprotein-cholesterol, high-density lipoprotein-cholesterol, and albumin were 51%, 0% and 0%, respectively, indicating that the adsorbent has a specific affinity for low-density lipoprotein.

EXAMPLE 12

The carrier obtained in Example 10 was reacted with epichlorohydrin at 45° C. for 2 hours and, then, reacted with aniline at 50° C. for 6 hours to provide an adsorbent carrying aniline immobilized thereon.

Using the above adsorbent, the adsorption rates were determined under the same conditions as in Example 11. The adsorption rates of low-density lipoprotein-cholesterol, high-density lipoprotein-cholesterol, and albumin were 55%, 0% and 0%, respectively, indicating the affinity of the adsorbent for low-density lipoprotein.

It is clear from Examples 11 and 12 that the carrier of Example 10 on which a substance having an affinity for a target substance was immobilized can be used as an adsorbent.

INDUSTRIAL APPLICABILITY

The cellulosic particle body according to the first invention and the perfusion type cellulosic particle body according to the second invention, the structures of which have been described hereinbefore, provide for a comparatively large freedom of design in the aspect of particle size according to various applications and, depending on the size and internal structure, can be used with advantage in various applications such as gel filtration stationary phases, cellulosic ion exchanger substrates, carriers for affinity chromatography, carriers for adsorption of perfumes and chemicals, supports for immobilization of microbial cells and enzymes, and adsorbent carriers for purification of body fluids, among others. The method of producing the cellulosic particle body of the first invention and the method of producing the perfusion type cellulosic particle body of the second invention, both of which have been described hereinbefore, can be used to easily produce said cellulosic particle body of the first invention and said perfusion type cellulosic particle body of the second invention.

Furthermore, according to the third invention, crosslinked polymer particles can be interconnected via an organic binder to provide with ease a novel spherical type body with small restriction to the diameter of crosslinked polymer particles to be interconnected and structural characteristics that the surfaces of said particles have areas not covered with the organic binder but remaining exposed.

The spherical type body according to the third invention, which has the above-mentioned structural characteristics, permits effective expression of the properties of crosslinked polymer particles without compromise of their inherent function and therefore finds application as adsorbents in the field of medical care, for example as chromatographic column packings and in body fluid purification systems. The spherical type body of this invention can be reused by dissolving out the organic binder to regenerate the crosslinked polymer particles.

In addition, the adsorbent for purification of body fluids according to the fourth invention, the construction of which has been described hereinbefore, has a high degree of dynamic adsorptivity so that it can be expected to reduce the therapeutic treatment time and, hence, improve the patient's quality of life.

What is claimed is:

1. An adsorbent for purification of a body fluid which comprises a perfusion type carrier having flow-through pores and sub-pores and, as immobilized thereon, a substance having an affinity for a target substance in the body fluid, and which has a mean particle diameter of not less than $200 \times 10^{-6}$ m and produces a perfusion effect when a housing packed with it is irrigated at a liner velocity of not less than $3 \times 10^{-4}$ m/s.

2. The adsorbent for purification of a body fluid according to claim 1 wherein the perfusion type carrier comprises a perfusion type cellulosic particle body which comprises porous cellulosic small particles interconnected to have void between the cellulosic small particles as produced by dispersing the porous cellulosic small particles in an alkaline medium to prepare a suspension and contacting the resulting suspension with a coagulating solution.

3. The adsorbent for purification of a body fluid according to claim 1 wherein the perfusion type cater is a spherical type body which comprises crosslinked polymer particles having diameters within a range of $10 \times 10^{-6}$ m to $1 \times 10^{-3}$ m with a standard deviation of not greater than 100% of their mean diameter and which has a diameter of $200 \times 10^{-6}$ m in to $100 \times 10^{-3}$ m, and satisfies the following conditions (A) to (C):

(A) that said crosslinked polymer particles are interconnected via an organic binder comprising a non-crosslinked polymer;

(B) that the surfaces of said crosslinked polymer particles have area(s) not covered with said organic binder but remaining exposed;

(C) that voids exist between the interconnected crosslinked polymer particles.

4. The adsorbent for purification of a body fluid according to claim 3 wherein said crosslinked polymer particles have diameters of $0.1 \times 10^{-6}$ m to $10 \times 10^{-3}$ m.

5. The adsorbent for purification of a body fluid according to claim 1 which comprises particles having diameters within a range of $200 \times 10^{-6}$ m to $4000 \times 10^{-6}$ m and is intended for use in direct contact with whole blood.

6. The absorbent for purification of a body fluid according to claim 1 wherein the ratio of the mean diameter of said perfusion type particles to the mean diameter of flow-through pores of the perfusion type carrier thereof is not greater than 70.

7. The adsorbent for purification of a body fluid according to claim 1 wherein the perfusion type carrier has a height equivalent to a theoretical plate of not greater than 0.5 m as determined when it is irrigated with a solution containing a target substance alone at a liner velocity of $1 \times 10^{-4}$ m/s to $10 \times 10^{-4}$ m/s.

8. An adsorption apparatus for purification of a body fluid comprising the adsorbent according to claim 1, as a packing.

9. A method of purifying a body fluid which comprises purifying the body fluid by means of the adsorption apparatus for purification of the body fluid according to claim 8.

* * * * *

UNITED STATES PATENT AND TRADEMARK OFFICE
CERTIFICATE OF CORRECTION

PATENT NO. : 6,599,620 B1
DATED : July 29, 2003
INVENTOR(S) : Fujita et al.

It is certified that error appears in the above-identified patent and that said Letters Patent is hereby corrected as shown below:

<u>Column 36,</u>
Line 18, change "liner" to -- linear --.
Line 29, change "cater" to -- carrier --.
Line 33, delete "in".
Line 50, change "absorbent" to -- adsorbent --.

Signed and Sealed this

First Day of June, 2004

JON W. DUDAS
*Acting Director of the United States Patent and Trademark Office*